US011857910B2

United States Patent
Tchalala et al.

(10) Patent No.: US 11,857,910 B2
(45) Date of Patent: Jan. 2, 2024

(54) METAL-ORGANIC FRAMEWORKS FOR SORPTION AND SENSING APPLICATIONS

(71) Applicant: King Abdullah University of Science and Technology, Thuwal (SA)

(72) Inventors: Mohamed Rachid Tchalala, Thuwal (SA); Karumbaiah Nanaiah, Thuwal (SA); Karim Adil, Thuwal (SA); Youssef Belmabkhout, Thuwal (SA); Mohamed Eddaoudi, Thuwal (SA); Khaled N. Salama, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 354 days.

(21) Appl. No.: 17/251,471

(22) PCT Filed: Jun. 11, 2019

(86) PCT No.: PCT/IB2019/054872
§ 371 (c)(1),
(2) Date: Dec. 11, 2020

(87) PCT Pub. No.: WO2019/239324
PCT Pub. Date: Dec. 19, 2019

(65) Prior Publication Data
US 2021/0252448 A1 Aug. 19, 2021

Related U.S. Application Data

(60) Provisional application No. 62/859,871, filed on Jun. 11, 2019, provisional application No. 62/683,296, filed on Jun. 11, 2018.

(51) Int. Cl.
*B01D 53/04* (2006.01)
*B01J 20/22* (2006.01)
(Continued)

(52) U.S. Cl.
CPC ............ *B01D 53/04* (2013.01); *B01J 20/226* (2013.01); *G01N 27/226* (2013.01);
(Continued)

(58) Field of Classification Search
CPC .............. B01D 53/04; B01D 2253/204; B01D 2257/302; B01D 2257/504;
(Continued)

(56) References Cited

U.S. PATENT DOCUMENTS

| 7,880,026 | B2* | 2/2011 | Ni ........................... C01G 9/00 549/3 |
| 8,123,834 | B2* | 2/2012 | Masel .................. B01J 20/3265 95/82 |

(Continued)

FOREIGN PATENT DOCUMENTS

| JP | 09264863 A2 | 10/1997 |
| JP | 2015169489 A2 | 9/2015 |

(Continued)

OTHER PUBLICATIONS

Notification of Reason for Refusal for Application No. 10-2021-7000225, dated May 3, 2022, 12 pages.
(Continued)

*Primary Examiner* — Francis C Gray
(74) *Attorney, Agent, or Firm* — Billion & Armitage

(57) ABSTRACT

Metal-organic frameworks for capturing one or more of $SO_2$, $CO_2$, and $H_2O$ are disclosed herein. Non-limiting examples of metal-organic frameworks include NbOFFIVE-1-Ni and AlFFIVE-1-Ni, among others. The metal-organic frameworks can be used in applications for removing and/or sensing one or more of $SO_2$, $CO_2$, and $H_2O$ from a fluid composition or an environment, either of which can proceed under dry or humid conditions and/or at room temperature.

20 Claims, 34 Drawing Sheets

(51) Int. Cl.
*G01N 27/22* (2006.01)
*G01N 29/02* (2006.01)
*G01N 29/036* (2006.01)

(52) U.S. Cl.
CPC ......... *G01N 29/022* (2013.01); *G01N 29/036* (2013.01); *B01D 2253/204* (2013.01); *B01D 2257/302* (2013.01); *B01D 2257/504* (2013.01); *B01D 2257/80* (2013.01); *G01N 2027/222* (2013.01); *G01N 2291/0256* (2013.01); *G01N 2291/0426* (2013.01)

(58) Field of Classification Search
CPC ............. B01D 2258/0283; B01D 53/02; B01J 20/226; G01N 27/226; G01N 29/022; G01N 29/036; G01N 2291/0256; G01N 2291/0426; Y02C 20/40; C01F 15/00; C01F 3/00; C01F 1/00
See application file for complete search history.

(56) References Cited

U.S. PATENT DOCUMENTS

| | | | | |
|---|---|---|---|---|
| 8,269,029 | B2 * | 9/2012 | Masel | ................... C07C 51/412 556/136 |
| 2008/0177098 | A1 | 7/2008 | Bahnmuller et al. | |
| 2015/0047505 | A1 * | 2/2015 | Schroder | ................ B01D 53/02 95/137 |
| 2017/0173623 | A1 * | 6/2017 | Britt | ....................... B01J 20/226 |
| 2018/0093218 | A1 * | 4/2018 | Eddaoudi | ............. B01J 20/3483 |
| 2018/0093250 | A1 | 4/2018 | Eddaoudi et al. | |
| 2018/0304246 | A1 * | 10/2018 | Eddaoudi | ............... B01D 53/02 |
| 2019/0270078 | A1 * | 9/2019 | Eddaoudi | ............... B01J 20/226 |
| 2020/0114301 | A1 * | 4/2020 | Cadiau | ................ B01J 20/3483 |

FOREIGN PATENT DOCUMENTS

| | | |
|---|---|---|
| KR | 20180012179 A | 2/2018 |
| WO | 2016121155 A1 | 8/2016 |
| WO | 2016162834 A1 | 10/2016 |
| WO | 2016187641 A1 | 12/2016 |

OTHER PUBLICATIONS

PCT Search Report and Written Opinion for PCT App. No. PCT/IB2019/054872 dated Jan. 10, 2020.
"Communication Pursuant to Rule 94(3) EPC dated Oct. 20, 2022", 8 pages, EP Application No. 19752248.5.
"Final Rejection, dated Nov. 22, 2022", 14 Pages, JP Application No. P2020-569074.
Office Action dated Jan. 16, 2023, 23 pages, KR Application No. 10-..2021-7000225.

* cited by examiner

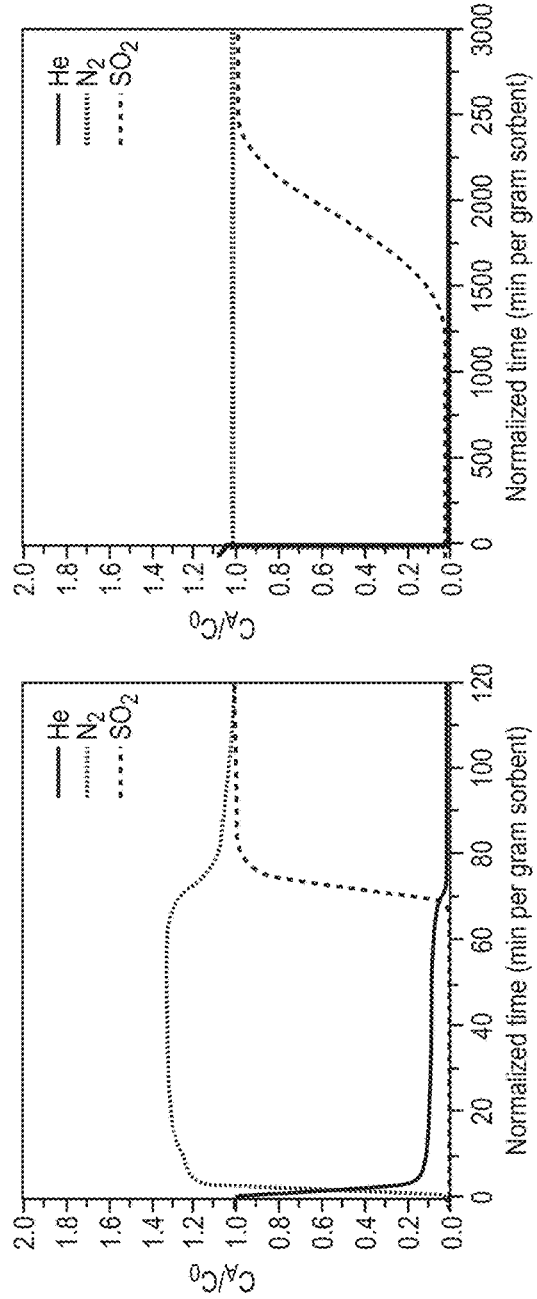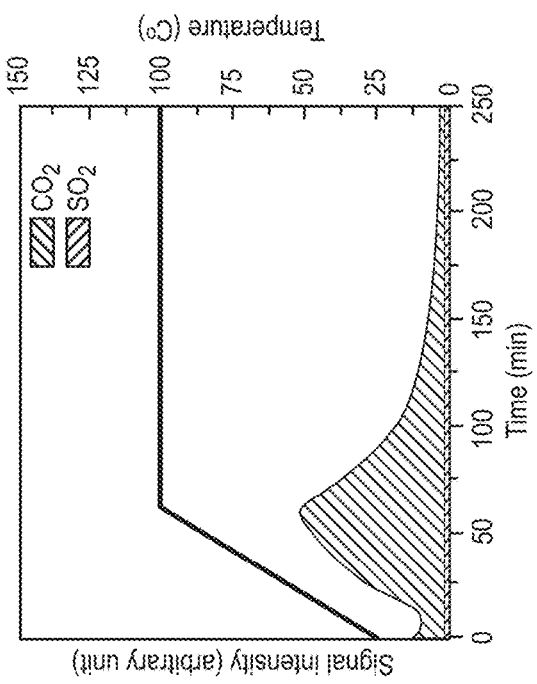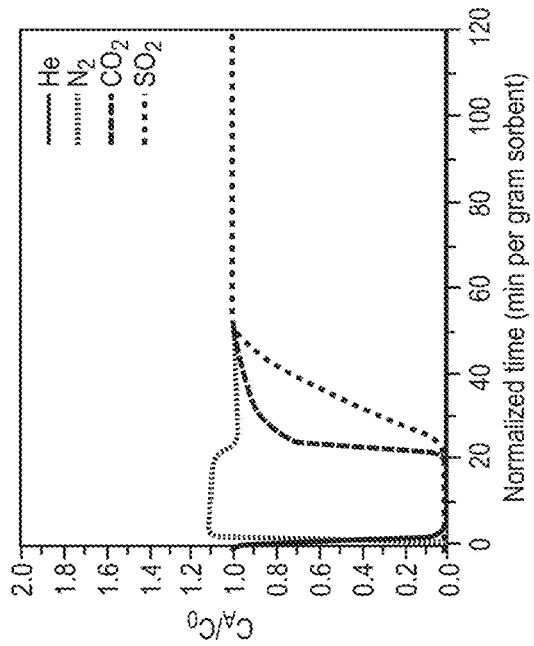
FIG. 15A  FIG. 15B  FIG. 15C  FIG. 15D

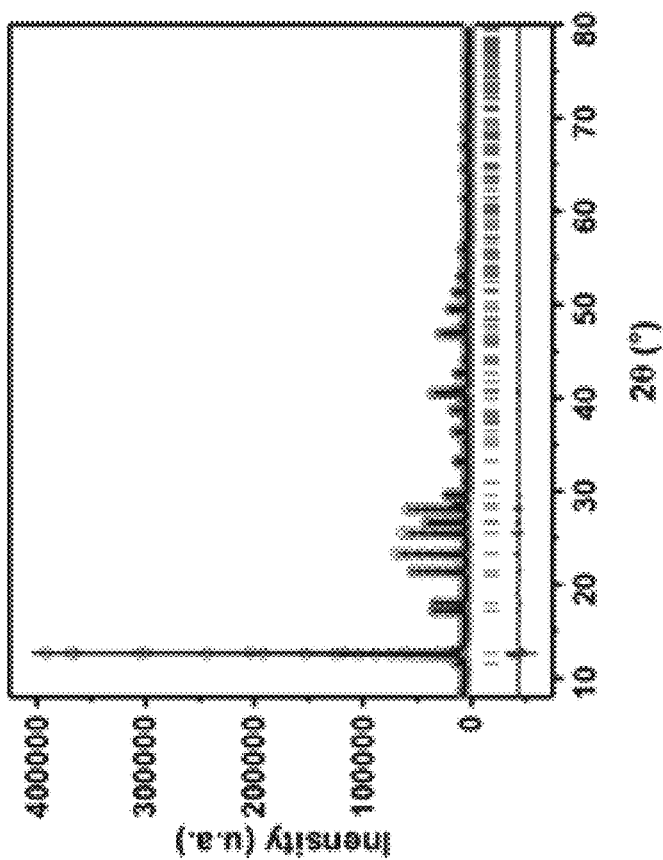
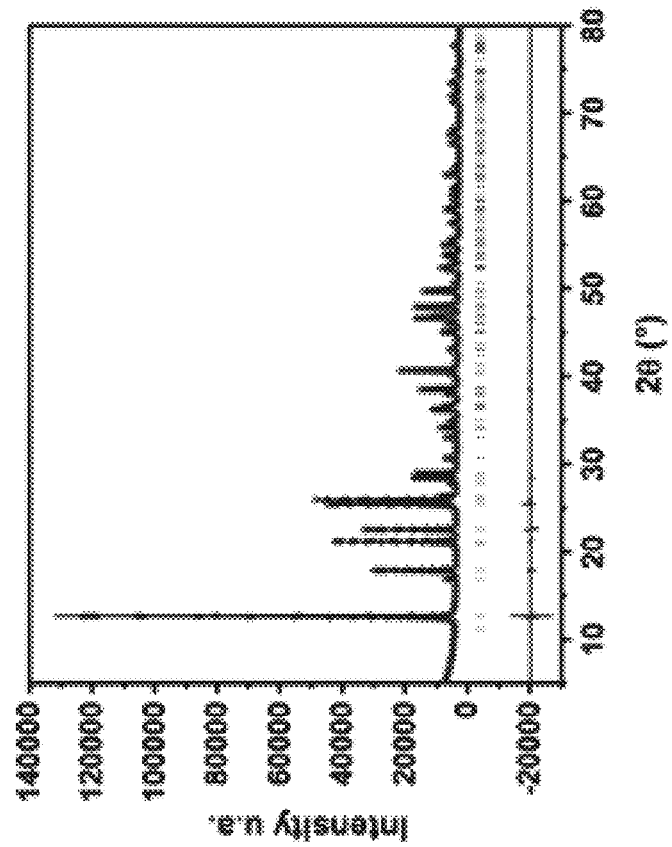
FIG. 19A
FIG. 19B

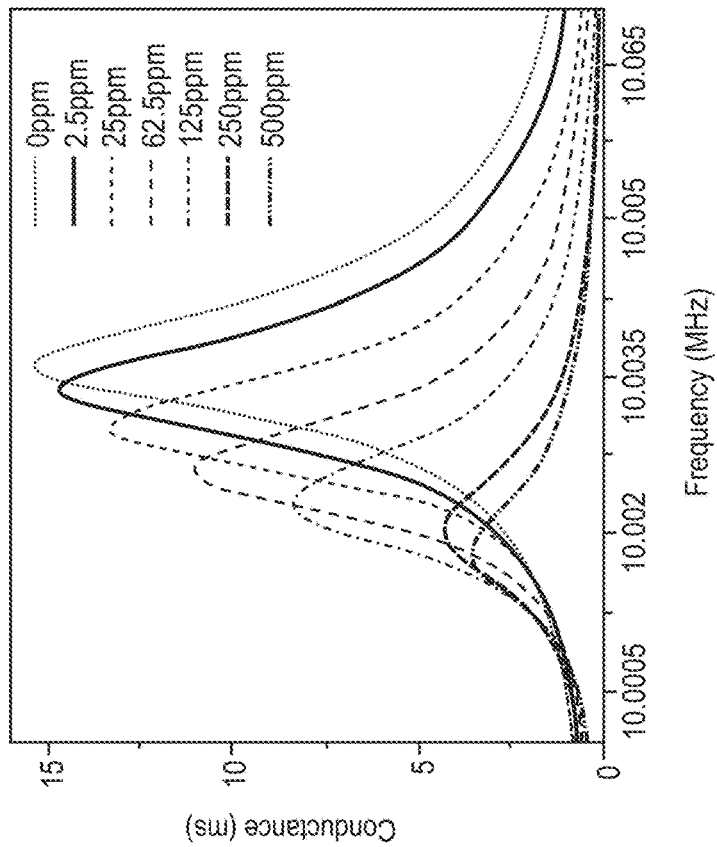
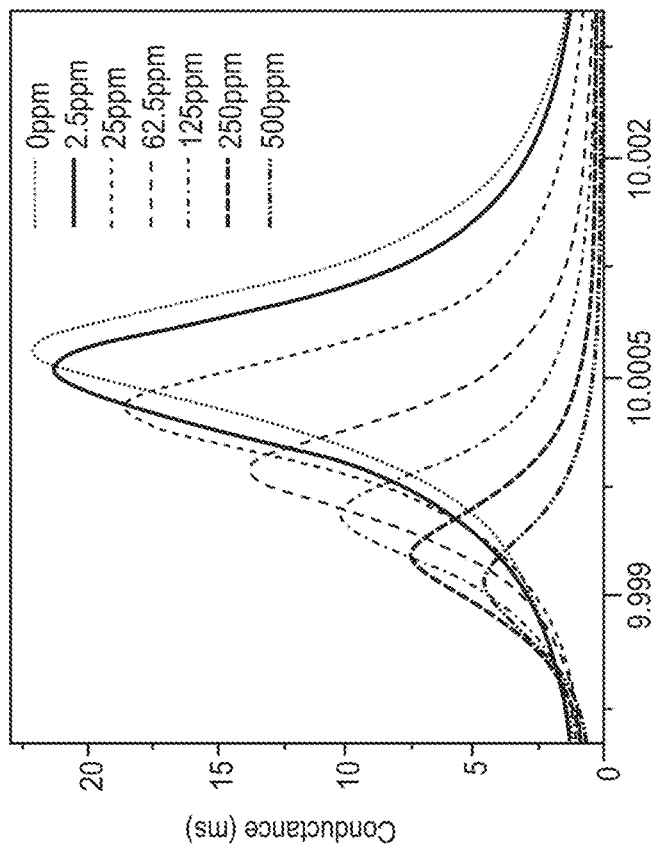
FIG. 21B
FIG. 21A

METAL-ORGANIC FRAMEWORKS FOR SORPTION AND SENSING APPLICATIONS

BACKGROUND

Global warming and other environmental/ecological issues have forced our society to adopt stringent rules for industrial waste and be on the lookout for ways to improve indoor and outdoor air quality, including in industrial sites. One major form of industrial waste with an adverse effect on the environment is flue gas. Flue gas generated by large industries and power plants resulting from burning fossil fuel contains $CO_2$ (at a low percent concentration), $SO_2$ (500-2000 ppm), $NO_2$ (few ppm), water vapor, and nitrogen (as the dominant gas). Although the concentration of $SO_2$ in flue gas feed is low, it could be poisonous for most liquid- and/or solid-state-based $CO_2$ separating agents. Therefore, the removal of $SO_2$ from flue gas is of prime importance. Current $SO_2$ removal technology involves the irreversible acid-base reaction of $SO_2$ with CaO to form $CaSO_3$. The main drawback of this technology is its relatively low removal efficiency (<90%) associated with an almost impossible regeneration step due to its extremely energy-intensive cost. Therefore, cyclable physical sorption technology is perceived as an alternate approach. Hence, identification of an adsorbent that can efficiently capture $SO_2$ at low concentration (<500 ppm) is crucial.

When $SO_2$ is not controlled and is emitted into the atmosphere, it has adverse effects on the environment, such as acid rain, and must be monitored. Therefore, it is necessary to find efficient solutions to sense $SO_2$ at ppm level (above 25 ppm) in both dry and humid conditions. Recently, there has been a considerable effort to develop $SO_2$ sensing devices based on metal oxides (such as $SnO_2$, $WO_3$, and $TiO_2$) due to their excellent sensitivity, selectivity, response time, and recovery time. However, most of the semiconductor-based $SO_2$ sensors were reported to require high temperatures (200-600° C.), leading to high levels of power consumption. There is therefore a need for gas sensors that operate at room temperature (RT), which would be an important parameter and invaluable milestone for developing alternate materials suitable for detecting $SO_2$.

In addition, maintaining safe levels of $CO_2$ and humidity in indoor environments or confined spaces is a top priority but often also a major challenge for environmental technologies. Consequently, major research efforts have recently been devoted to developing new technologies and processes that can effectively detect and measure indoor levels of $CO_2$ and relative humidity (RH). Technologies currently available for the detection of $CO_2$ are based on either nondispersive infrared (NDIR) sensors or chemical $CO_2$ gas sensors. These technologies present many drawbacks, such as elevated working temperatures (300-800° C.), prohibitive costs, and relatively shortened lifetimes. Transduction techniques, including acoustic, resistance, magnetic, resonance, optical, impedance, delay line, capacitance, thermal, and quartz crystal microbalance (QCM) techniques, have allowed the development of efficient humidity sensors. However, the presence of large amounts of $CO_2$ (found mainly in confined spaces) can alter the measure of RH levels by sensors. It is therefore imperative to develop robust and inexpensive sensors with the ability of simultaneously detecting $CO_2$ and $H_2O$ in a precise and reliable manner.

SUMMARY

In general, embodiments of the present disclosure relate to metal-organic frameworks for capturing and/or sensing one or more of $SO_2$, $CO_2$, and $H_2O$, methods of capturing and/or sensing one or more of $SO_2$, $CO_2$, and $H_2O$ using the metal-organic frameworks, and the like. In one aspect, the metal-organic frameworks are selective for one of $SO_2$, $CO_2$, and $H_2O$. In another aspect, the metal-organic frameworks concurrently (e.g., simultaneously) or sequentially capture and/or sense two or more of $SO_2$, $CO_2$, and $H_2O$.

Accordingly, embodiments of the present disclosure describe methods of capturing chemical species comprising contacting a metal-organic framework with a fluid composition including one or more of $SO_2$, $CO_2$, and $H_2O$, wherein the metal-organic framework comprises a square grid pillared by an inorganic building block, wherein the square grid is Ni(pyrazine)$_2$ and the inorganic building block is selected from $[NbOF_5]^{2-}$ or $[AlF_5(H_2O)]^{2-}$; and sorbing one or more of $SO_2$, $CO_2$, and $H_2O$ from the fluid composition on the metal-organic framework.

In some embodiments, the fluid composition includes $SO_2$ at a concentration in the range of about 25 ppm to about 500 ppm. In some embodiments, the fluid composition includes $SO_2$ and $CO_2$, and $SO_2$ is preferentially sorbed over $CO_2$ on the metal-organic framework. In some embodiments, the fluid composition includes $SO_2$ and $CO_2$, and $SO_2$ and $CO_2$ are both sorbed on the metal-organic framework. In some embodiments, $SO_2$ and $CO_2$ are sorbed about simultaneously on the metal-organic framework. In some embodiments, the fluid composition includes $CO_2$ at a concentration in the range of about 400 ppm to about 5000 ppm. In some embodiments, the fluid composition includes $CO_2$ and $H_2O$, and $CO_2$ is preferentially sorbed over $H_2O$ on the metal-organic framework. In some embodiments, the fluid composition includes $CO_2$ and $H_2O$, and $CO_2$ and $H_2O$ are both sorbed on the metal-organic framework. In some embodiments, the $CO_2$ and $H_2O$ are sorbed about simultaneously on the metal-organic framework. In some embodiments, the sorbing proceeds at about room temperature.

Embodiments of the present disclosure describe methods of capturing chemical species using NbOFFIVE-1-Ni comprising contacting a metal-organic framework with a fluid composition including at least $SO_2$ and $CO_2$, wherein the metal-organic framework is characterized by the chemical formula NiNbOF$_5$(pyrazine)$_2 \cdot$x(solv); sorbing one or more of $SO_2$ and $CO_2$ on the metal-organic framework; and optionally regenerating the metal-organic framework.

Embodiments of the present disclosure describe methods of capturing chemical species using AlFFIVE-1-Ni comprising contacting a metal-organic framework with a fluid composition including at least $SO_2$ and $CO_2$, wherein the metal-organic framework is characterized by the chemical formula NiAlF$_5$(H$_2$O)(pyrazine)$_2 \cdot$x(solv); sorbing one or more of $SO_2$ and $CO_2$ on the metal-organic framework; and optionally regenerating the metal-organic framework.

Embodiments of the present disclosure describe methods of detecting one or more analytes comprising exposing a sensor to an environment containing one or more of $SO_2$, $CO_2$, and $H_2O$, wherein the sensor includes a layer of a metal-organic framework as a sensing layer, wherein the metal-organic framework comprises a square grid pillared by an inorganic building block, wherein the square grid is Ni(pyrazine)$_2$ and the inorganic building block is selected from $[NbOF_5]^{2-}$ or $[AlF_5(H_2O)]^{2-}$; and detecting a presence of the $SO_2$, $CO_2$, $H_2O$, or a combination thereof in the environment using the sensor.

In some embodiments, the detecting proceeds at about room temperature. In some embodiments, the detecting includes detecting $SO_2$ optionally in the presence of $H_2O$. In some embodiments, the detecting includes detecting between 25 ppm SO$_2$ to about 500 ppm SO$_2$. In some embodiments, the detecting includes detecting CO$_2$ optionally in the presence of H$_2$O. In some embodiments, the detecting includes detecting between about 400 ppm of CO$_2$ and 5000 ppm of CO$_2$. In some embodiments, the detecting includes detecting H$_2$O optionally in the presence of CO$_2$. In some embodiments, the detecting includes detecting relative humidity levels in the environment below about 40% RH and/or greater than about 60% RH. In some embodiments, the sensor is a capacitive sensor comprising an interdigitated electrode, wherein the sensing layer is deposited on the interdigitated electrode of the capacitive sensor, wherein the presence of one or more of SO$_2$, CO$_2$, and H$_2$O is detected by measuring a change in capacitance in the sensing layer. In some embodiments, the sensor is a QCM sensor comprising an electrode, wherein the sensing layer is deposited on the electrode of the QCM, wherein the presence of one or more of SO$_2$, CO$_2$, and H$_2$O is detected by measuring a change in resonance frequency in the sensing layer.

Embodiments of the present disclosure describe methods of sensing using NbOFFIVE-1-Ni comprising exposing a sensor to an environment containing at least SO$_2$, wherein the sensor includes a layer of a metal-organic framework as a sensing layer; wherein the metal-organic framework is characterized by NiNbOF$_5$(pyrazine)$_2$·x(solv); detecting a presence of SO$_2$ in the environment using the sensor; and optionally regenerating the sensor.

Embodiments of the present disclosure describe methods of sensing using AlFFIVE-1-Ni comprising exposing a sensor to an environment containing at least SO$_2$, wherein the sensor includes a layer of a metal-organic framework as a sensing layer; wherein the metal-organic framework is characterized by NiAlF$_5$(H$_2$O)(pyrazine)$_2$·x(solv); detecting a presence of SO$_2$ in the environment using the sensor; and optionally regenerating the sensor.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 15A-15D are graphical views showing AlFFIVE-1-Ni breakthrough experiments for (a) SO$_2$/N$_2$:7/93 (10 cc/min, flow rate), (b) SO$_2$/N$_2$:0.05/99.95 mixture (40 cc/min, flow rate), and (c) SO$_2$/CO$_2$/N$_2$:0.05/10/89.95 (40 cc/min, flow rate); (d) TPD experiment suggests a considerable amount of SO$_2$ along with CO$_2$ as adsorbed phase after a breakthrough experiment with 500 ppm SO$_2$ in the presence of 10% CO$_2$ and balance N$_2$, according to one or more embodiments of the present disclosure.

FIGS. 19A-19B are graphical views of final Le Bail profile refinement with observed (black line), calculated (red point), and difference (blue line) profiles of X-ray of diffraction data, vertical green bars are related to the calculated Bragg reflection positions: (a) NbOFFIVE-1-Ni (Rp=0.074, Rwp=0.079, Rexp=0.031, χ2=6.73). (b) AlFFIVE-1-Ni (Rp=0.086, Rwp=0.108, Rexp=0.022,)(2=23.1), according to one or more embodiments of the present disclosure.

FIGS. 21A-21B are graphical views showing variation of the peak resonance frequency (a) NbOFFIVE-1-Ni (b) AlFFIVE-1-Ni, in response to the introduction of various concentrations of dry $SO_2$, according to one or more embodiments of the present disclosure.

DETAILED DESCRIPTION

Figure 1:
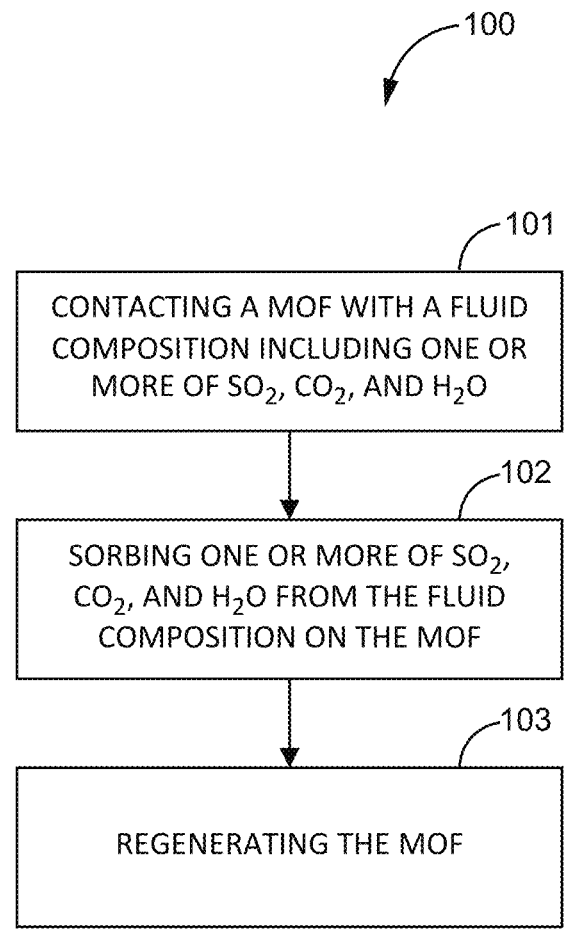
FIG. 1 is a flowchart of a method of capturing chemical species, according to one or more embodiments of the present disclosure.

Metal-organic frameworks for capturing one or more of $SO_2$, $CO_2$, and $H_2O$ are disclosed herein. Non-limiting examples of metal-organic frameworks include NbOFFIVE-1-Ni and AlFFIVE-1-Ni, among others. The metal-organic frameworks can be used in applications for removing and/or sensing one or more of $SO_2$, $CO_2$, and $H_2O$ from a fluid composition or an environment, either of which can proceed under dry or humid conditions and/or at room temperature. For example, the metal-organic frameworks can be used as sorbents for removing $SO_2$ from flue gas, or the metal-organic frameworks can be incorporated into QCM- or IDE-based sensors as the sensing layer for detecting and/or measuring the presence of one or more of $SO_2$, $CO_2$, and $H_2O$. Such sensors can detect concentrations as low as 25 ppm to 500 ppm $SO_2$, 400 ppm to 5000 ppm $CO_2$, and relative humidity levels in an environment below 25% RH and/or above 65% RH, all of which is unprecedented. In either application, the sorption can be reversible such that the metal-organic frameworks may be regenerated and reused. These features and others are described elsewhere herein.

Definitions

The terms recited below have been defined as described below. All other terms and phrases in this disclosure shall be construed according to their ordinary meaning as understood by one of skill in the art.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "contacting" may, in addition or in the alternative, refer to, among other things, feeding, flowing, passing, injecting, introducing, and/or providing the fluid composition (e.g., a feed gas).

As used herein, "detecting" refers to determining a presence and/or concentration of one or more chemical species.

As used herein, "exposing" refers to subjecting to conditions of an environment. For example, conditions of an environment may include, among other things, one or more of temperature, pressure, and chemical species present in the environment. In addition or in the alternative, exposing refers to subjecting to objects present in an environment.

As used herein, "sorbing" refers to one or more of absorbing and adsorbing. Sorbing may include selective sorption, such as sorption of a single species, subsequent sorption, such as sorption of a first species and then a second species (e.g., which may or may not replace the first species), or simultaneous sorption, such as sorption of two or more species at about the same time. Capturing is an example of sorbing.

As used herein, "capturing" refers to the act of removing one or more chemical species from a bulk fluid composition (e.g., gas/vapor, liquid, and/or solid). For example, "capturing" may include, but is not limited to, interacting, bonding, diffusing, adsorbing, absorbing, reacting, and sieving, whether chemically, electronically, electrostatically, physically, or kinetically driven.

FIG. 1 is a flowchart of a method of capturing chemical species, according to one or more embodiments of the present disclosure. As shown in FIG. 1, the method 100 may comprise contacting 101 a metal-organic framework with a fluid composition including one or more of $SO_2$, $CO_2$, and $H_2O$; sorbing 102 one or more of $SO_2$, $CO_2$, and $H_2O$ from the fluid composition on the metal-organic framework; and optionally regenerating 103 the metal-organic framework.

The step 101 includes contacting a metal-organic framework with a fluid composition including at least one or more of $SO_2$, $CO_2$, and $H_2O$. The contacting may include bringing the metal-organic framework and fluid composition into physical contact, or immediate or close proximity Examples of the contacting may include, but are not limited to, one or more of feeding, flowing, passing, pumping, and introducing. The contacting may proceed under any suitable conditions (e.g., temperature, pressure, etc.). For example, the contacting may proceed to or at a temperature ranging from about 0° C. to about 600° C. In many embodiments, the contacting may proceed at or to a temperature less than about 200° C. In preferred embodiments, the contacting may proceed at or to a temperature of about 25° C. (e.g., about room temperature).

The metal-organic framework may include fluorinated metal-organic frameworks characterized by square grids and pillars. The metal-organic framework may include a pillar characterized by the formula $M_bF_5(O/H_2O)$, where $M_b$ is $Al^{3+}$ or $Nb^{5+}$. The pillar may include an inorganic pillar or inorganic building block. In an embodiment, the pillar may be characterized by the chemical formula: $(AlF_5(H_2O))^{2-}$. In an embodiment, the pillar may be characterized by the chemical formula: $(NbOF_5)^{2-}$. The metal-organic framework may include a square grid characterized by the formula $(M_b(ligand)_x)$, where Ma is Ni and the ligand is pyrazine. In an embodiment, the square grid may be characterized by the formula $(Ni(pyrazine)_2)$. The pillar and square grid may assemble and/or associate to form a metal-organic framework characterized by one or more of the following chemical formulas: $NiNbOF_5(pyrazine)_2 \cdot x(solv)$ (NbOFFIVE-1-Ni) and $NiAlF_5(H_2O)(pyrazine)_2 \cdot x(solv)$ (AlFFIVE-1-Ni). For example, in an embodiment, the metal-organic framework may be characterized by the chemical formula: $NiNbOF_5(pyrazine)_2 \cdot x(solv)$. In an embodiment, the metal-organic framework may be characterized by the chemical formula: $NiAlF_5(H_2O)(pyrazine)_2 \cdot x(solv)$. The metal-organic frameworks may include a periodic array of open metal coordination sites and fluorine moieties within a contracted square-shaped one-dimensional channel. In an embodiment, the metal-organic frameworks may include AlFFIVE-1-Ni, wherein the AlFFIVE-1-Ni includes three pendant fluoride groups with a fluoride-fluoride distance of about 3.613 Å and one potential open metal site. In an embodiment, the metal-organic framework may include NbOFFIVE-1-Ni, wherein the NbOFFIVE-1-Ni includes four pendant fluoride groups with a fluoride-fluoride distance of about 3.210 and no open metal site.

The fluid composition may be present in any phase. For example, the fluid composition may be present in one or more of a gas/vapor phase, liquid phase, and solid phase. In many embodiments, the fluid composition may be present in a gas/vapor phase. The fluid composition may include one or more of $SO_2$, $CO_2$, and water (e.g., as water vapor and/or moisture, humidity) and optionally one or more other chemical species. In some embodiments, the fluid composition includes at least $SO_2$, optionally $CO_2$ and optionally water, and optionally one or more other chemical species. For example, in an embodiment, the fluid composition includes at least $SO_2$. In an embodiment, the fluid composition includes at least $SO_2$ and $CO_2$, and optionally water. In an embodiment, the fluid composition includes at least $SO_2$, $CO_2$, and water. In an embodiment, the fluid composition includes at least $SO_2$, $CO_2$, and water, and one or more other chemical species. The one or more other chemical species may include one or more of $NO_2$ and nitrogen. For example, in an embodiment, the fluid composition may be synthetic flue gas, which may include one or more of $SO_2$, $CO_2$, water vapor, $NO_2$, and nitrogen. In some embodiments, the fluid composition includes $CO_2$ and optionally $H_2O$. For example, in an embodiment, the fluid composition includes at least $CO_2$. In some embodiments, the fluid composition includes $H_2O$ and optionally $CO_2$. For example, in an embodiment, the fluid composition includes at least $H_2O$. In some embodiments, the fluid composition includes $CO_2$ and $H_2O$. In some embodiments, the fluid composition may be air (e.g., for detecting a presence of $SO_2$ at certain levels, $CO_2$ at certain levels, and/or water at certain levels).

The concentration of $SO_2$ in the fluid composition may range from greater than about 0 wt % to about 99.9 wt %. In many embodiments, the concentration of $SO_2$ in the fluid composition is less than about 7 wt %. In preferred embodiments, the concentration of $SO_2$ in the fluid composition is less than about 500 ppm. In other preferred embodiments, the concentration of $SO_2$ in the fluid composition is about 25 ppm or greater. In other preferred embodiments, the concentration of $SO_2$ in the fluid composition may range from about 25 ppm to about 500 ppm. In some embodiments, the concentration of $CO_2$ in the fluid composition is in the range of about 400 ppm to about 5000 ppm. In some embodiments, the concentration of $H_2O$ in the fluid composition is equivalent to a fluid composition having a relative humidity in the range of about 0.01% RH to about 100% RH.

The step 102 includes sorbing one or more of $SO_2$, $CO_2$, and $H_2O$ from the fluid composition on the metal-organic framework. The sorbing may include one or more of adsorbing, absorbing, and desorbing. In an embodiment, the sorbing may include absorbing and/or adsorbing one or more of $SO_2$, $CO_2$, and $H_2O$. In an embodiment, the sorbing may include absorbing one or more of $SO_2$, $CO_2$, and $H_2O$. In an embodiment, the sorbing may include adsorbing one or more of $SO_2$, $CO_2$, and $H_2O$. In an embodiment, the sorbing may include absorbing one or more of $SO_2$, $CO_2$, and $H_2O$. In an embodiment, the sorbing may include desorbing one or more of $SO_2$, $CO_2$, and $H_2O$. The sorbing may include one or more of selective sorption (e.g., sorption of one or more select compounds), sequential sorption (e.g., sorption in a sequence of species and/or sorption in which a sorbed species is replaced by another species), and simultaneous sorption (e.g., sorption of two or more compounds, such as two or more select compounds). The sorbing may proceed under conditions that are the same as or similar to the conditions of the contacting.

In some embodiments, the sorbing includes sorbing $SO_2$. In some embodiments, the sorbing includes sorbing $SO_2$ over $CO_2$. In some embodiments, the sorbing includes sorbing $SO_2$ and $CO_2$ about simultaneously or sequentially. In some embodiments, the sorbing includes sorbing $SO_2$ in the presence of $H_2O$. In some embodiments, the sorbing includes sorbing $SO_2$ over $CO_2$ in the presence of $H_2O$. In some embodiments, the sorbing includes sorbing $SO_2$ and $CO_2$ about simultaneously or sequentially in the presence of $H_2O$. In some embodiments, the sorbing includes sorbing $CO_2$. In some embodiments, the sorbing includes sorbing $H_2O$. In some embodiments, the sorbing includes sorbing $CO_2$ over $H_2O$. In some embodiments, the sorbing includes sorbing $CO_2$ in the presence of $H_2O$. In some embodiments, the sorbing includes sorbing $H_2O$ in the presence of $CO_2$. In some embodiments, the sorbing includes sorbing $CO_2$ and $H_2O$ about simultaneously or sequentially.

In some embodiments, the fluid composition includes $SO_2$ at a concentration in the range of about 25 ppm to about 500 ppm. In some embodiments, the fluid composition includes $SO_2$ and $CO_2$, and $SO_2$ is preferentially sorbed over $CO_2$ on the metal-organic framework. In some embodiments, the fluid composition includes $SO_2$ and $CO_2$, and $SO_2$ and $CO_2$ are both sorbed on the metal-organic framework. In some embodiments, $SO_2$ and $CO_2$ are sorbed about simultaneously on the metal-organic framework. In some embodiments, the fluid composition includes $CO_2$ at a concentration in the range of about 400 ppm to about 5000 ppm. In some embodiments, the fluid composition includes $CO_2$ and $H_2O$, and $CO_2$ is preferentially sorbed over $H_2O$ on the metal-organic framework. In some embodiments, the fluid composition includes $CO_2$ and $H_2O$, and $CO_2$ and $H_2O$ are both sorbed on the metal-organic framework. In some embodiments, the $CO_2$ and $H_2O$ are sorbed about simultaneously on the metal-organic framework. In some embodiments, the sorbing proceeds at about room temperature.

In some embodiments, the metal-organic frameworks may exhibit one or more of a high removal efficiency and/or high uptake, even at low concentrations of $SO_2$. For example, the metal-organic frameworks may exhibit a removal efficiency of greater than about 70%, greater than about 80%, and/or greater than about 90%. In many embodiments, the metal-organic frameworks exhibit a removal efficiency of greater than about 90%. For example, the metal-organic frameworks may exhibit a removal efficiency of greater than about 91%, greater than about 92%, greater than about 93%, greater than about 94%, greater than about 95%, greater than about 96%, greater than about 97%, greater than about 98%, and/or greater than about 99%. The metal-organic frameworks may exhibit a high uptake of $SO_2$ even at low concentrations, such as concentrations of $SO_2$ ranging from 25 ppm to 500 ppm.

The metal-organic frameworks may exhibit an about equal selectivity toward $SO_2$ and $CO_2$ and/or a selectivity toward $SO_2$ over $CO_2$. In an embodiment, the metal-organic framework includes NbOFFIVE-1-Ni. The NbOFFIVE-1-Ni may exhibit equal (e.g., about equal) selectivity toward $SO_2$ and $CO_2$. In these embodiments, the NbOFFIVE-1-Ni may exhibit simultaneous (e.g., about simultaneous and/or substantially simultaneous) sorption of $SO_2$ and $CO_2$, even at low concentrations of $SO_2$ and/or in a presence of water (e.g., water vapor, humidity). For example, the NbOFFIVE-1-Ni may simultaneously sorb $SO_2$ and $CO_2$, where a concentration of $SO_2$ is less than about 500 ppm. In another embodiment, NbOFFIVE-1-Ni may exhibit a selectivity toward $SO_2$ over $CO_2$.

In an embodiment, the metal-organic framework includes AlFFIVE-1-Ni. The AlFFIVE-1-Ni may exhibit a reduced affinity for $CO_2$ (e.g., relative to NbOFFIVE-1-Ni) such that the AlFFIVE-1-Ni selectively sorbs $SO_2$ over $CO_2$, even at low concentrations of $SO_2$ (e.g., less than about 500 ppm) and/or in a presence of water (e.g., water vapor, humidity). For example, a selectivity of $SO_2/CO_2$ may be about 66. In these embodiments, the AlFFIVE-1-Ni may exhibit a selectivity towards $SO_2$ over $CO_2$. In an embodiment, the AlFFIVE-1-Ni may sorb $SO_2$ to the substantial exclusion of $CO_2$. In an embodiment, the AlFFIVE-1-Ni may, at first, simultaneously sorb $SO_2$ and $CO_2$ and, over time, $SO_2$ may replace the sorbed $CO_2$, demonstrating an overall affinity for $SO_2$. In another embodiment, the AlFFIVE-1-Ni may exhibit an about equal selectivity for $SO_2$ and $CO_2$.

The step 103 is optional and includes regenerating the metal-organic framework. The regenerating may include thermal treatment in a vacuum and/or inert gas environment (e.g., under nitrogen). For example, in an embodiment, the regenerating may include heating to or at a temperature of about 105° C. in a vacuum. In an embodiment, the regenerating may include heating to or at a temperature of about 105° C. in an inert gas environment. In other embodiments, the temperature of regenerating may be less than and/or greater than about 105° C.

Figure 2:
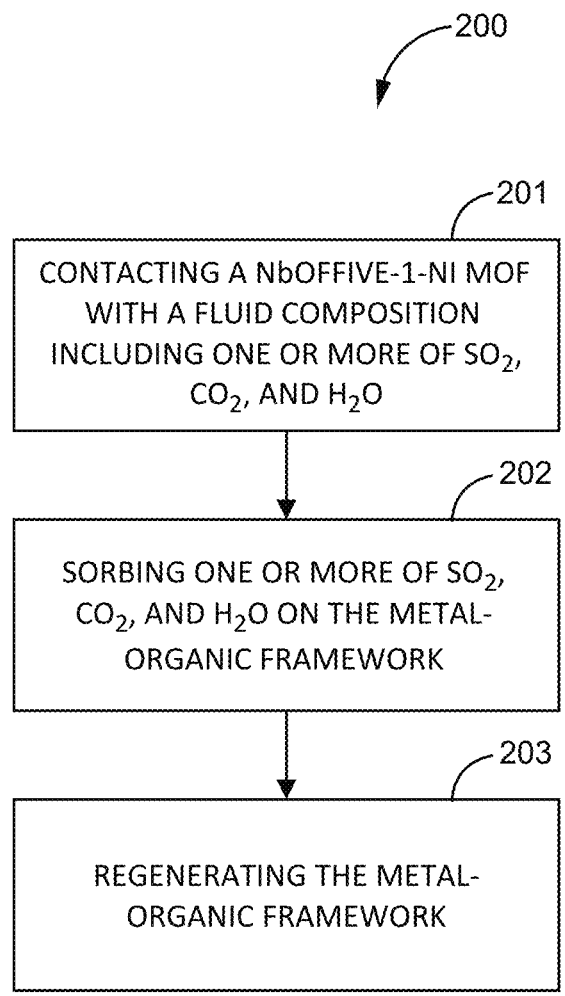
FIG. 2 is a flowchart of a method of capturing chemical species using NbOFFIVE-1-Ni, according to one or more embodiments of the present disclosure.

FIG. 2 is a flowchart of a method of a method of capturing chemical species using $NiNbOF_5(pyrazine)_2 \cdot x(solv)$, according to one or more embodiments of the present disclosure. As shown in FIG. 2, the method 200 may comprise contacting 201 a metal-organic framework with a fluid composition including one or more of $SO_2$, $CO_2$, and $H_2O$, wherein the metal-organic framework is characterized by the chemical formula $NiNbOF_5(pyrazine)_2 \cdot x(solv)$; sorbing 202 one or more of $SO_2$, $CO_2$, and $H_2O$ on the metal-organic framework; and optionally regenerating 203 the metal-organic framework. In an embodiment, one or more of $SO_2$, $CO_2$, and $H_2O$ are sorbed simultaneously (e.g., about simultaneously, substantially simultaneously, simultaneously, etc.) on the metal-organic framework.

Figure 3:
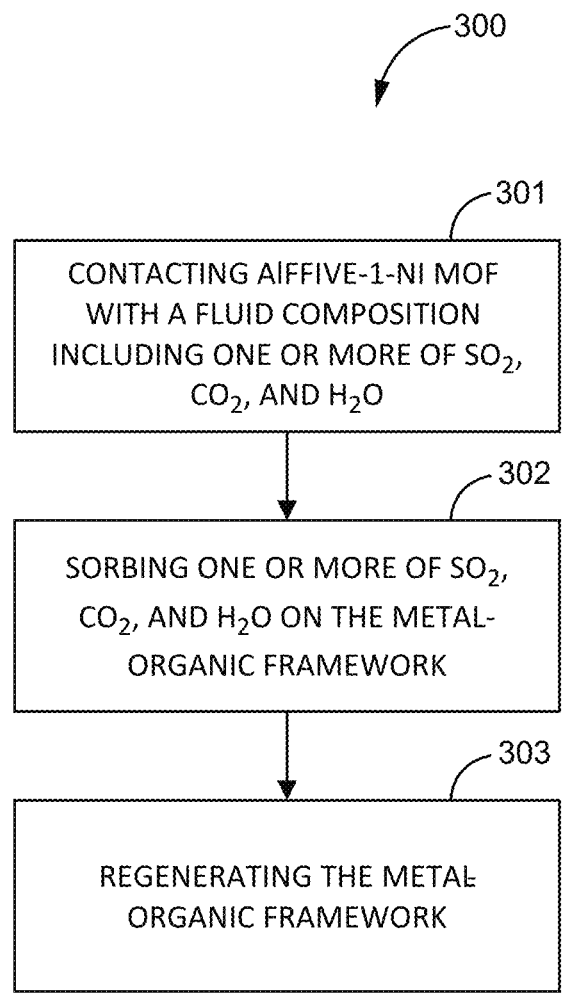
FIG. 3 is a flowchart of a method of capturing chemical species using AlFFIVE-1-Ni, according to one or more embodiments of the present disclosure.

FIG. 3 is a flowchart of a method of capturing chemical species using $NiAlF_5(H_2O)(pyrazine)_2 \cdot x(solv)$, according to one or more embodiments of the present disclosure. As shown in FIG. 3, the method 300 may comprise contacting 301 a metal-organic framework with a fluid composition including one or more of $SO_2$, $CO_2$, and $H_2O$, wherein the metal-organic framework is characterized by the chemical formula $NiAlF_5(H_2O)(pyrazine)_2 \cdot x(solv)$; sorbing 302 one or more of $SO_2$, $CO_2$, and $H_2O$ on the metal-organic framework; and optionally regenerating 303 the metal-organic framework. In an embodiment, the metal-organic framework exhibits a selectivity towards $SO_2$ over $CO_2$.

Figure 4:
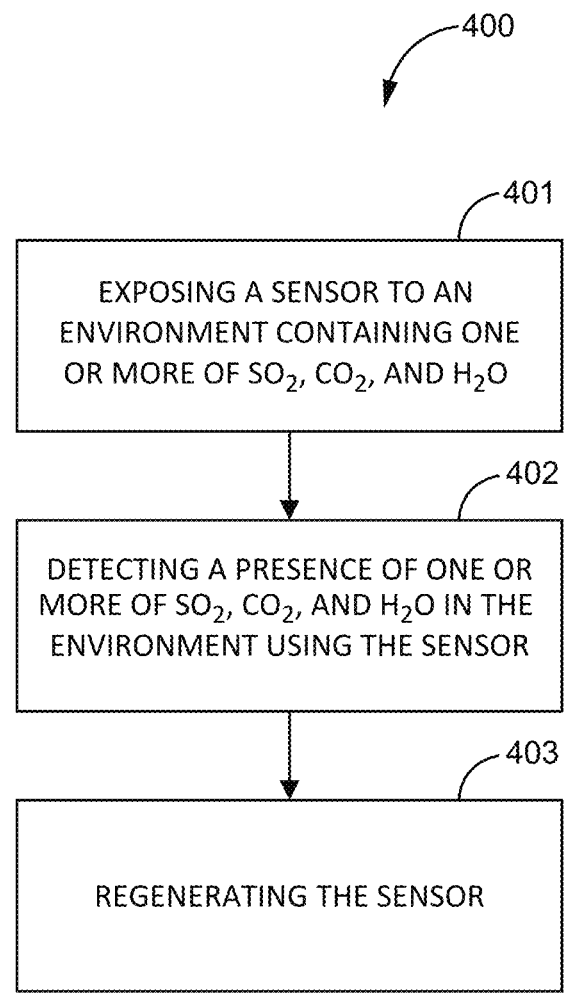
FIG. 4 is a flowchart of a method of sensing, according to one or more embodiments of the present disclosure.

FIG. 4 is a flowchart of a method of sensing, according to one or more embodiments of the present disclosure. As shown in FIG. 4, the method 400 may comprise exposing 401 a sensor to an environment containing one or more of $SO_2$, $CO_2$, and $H_2O$; detecting 402 a presence of one or more of $SO_2$, $CO_2$, $H_2O$ in the environment using the sensor; and optionally regenerating 403 the sensor.

The step 401 includes exposing a sensor to an environment containing one or more of $SO_2$, $CO_2$, and $H_2O$. The exposing may include subjecting to conditions of an environment. For example, the exposing may include subjecting the sensor to conditions and/or objects of an environment, which may include, but are not limited to, one or more of temperature and chemical species present in the environment. The environment may be an environment contaminated or potentially contaminated with $SO_2$ and/or with harmful or unsafe levels of $CO_2$ and/or with harmful or unsafe levels of humidity. The environment may be a dry and/or humid environment. For example, in an embodiment, the environment may not include any water vapor or negligible amounts of water vapor. In an embodiment, the environment may include non-negligible amounts of water vapor. The environment may be characterized by a relative humidity (RH) ranging from about 0% RH to about 100% RH. For example, in an embodiment, the environment may be characterized by a RH greater than about 60% and/or less than about 40%. The environment may be characterized by any temperature ranging from about 0° C. to about 600° C. In many embodiments, the temperature of the environment may be less than about 200° C. In preferred embodiments, the temperature of the environment may be about 25° C. (e.g., about room temperature).

The metal-organic framework may be deposited as a sensing layer on a substrate to form a sensor. For example, in many embodiments, the sensor includes a layer of a metal-organic framework as the sensing layer. Any of the metal-organic frameworks of the present disclosure may be used as the sensing layer of the sensor. For example, in an embodiment, the sensor includes a layer of a metal-organic framework as the sensing layer, wherein the metal-organic framework is NbOFFIVE-1-Ni or a metal-organic framework characterized by the formula $NiNbOF_5(pyrazine)_2 \cdot x$ (solv). In an embodiment, the sensor includes a layer of a metal-organic framework as the sensing layer, wherein the metal-organic framework is AlFFIVE-1-Ni or a metal-organic framework characterized by the formula $NiAlF_5(H_2O)(pyrazine)_2 \cdot x(solv)$. The metal-organic frameworks may be uniformly deposited (e.g., about uniformly deposited) on a substrate with low intergranular voids and/or random orientation. The layer may include crystallites ranging in size from about 150 nm to about 30 μm. The substrate may include any suitable support and/or substrate known in the art and/or commonly used in sensors. In a preferred embodiment, the substrate includes a quartz crystal microbalance (QCM) substrate. In another preferred embodiment, the substrate includes a capacitive interdigitated electrode (IDE) substrates. The sensors may further comprise any additional components known in the art and/or commonly included in sensors.

The step 402 includes detecting a presence of one or more of $SO_2$, $CO_2$, and $H_2O$ in the environment using the sensor. The detecting may include measuring and/or monitoring a change in an electronic or physical property of the sensor in response to an interaction between the sensor and one or more chemical species, such as one or more of $SO_2$, $CO_2$, and $H_2O$. The detecting may be used to determine a presence and/or concentration of one or more chemical species. In some embodiments, the interaction may be characterized as a change in an electronic or physical property of the sensor upon sorbing and/or desorbing one or more chemical species. The sorbing and/or desorbing may proceed as described herein. A change in capacitance may be measured in response to the sorption and/or desorption of one or more chemical species. A change in resonance frequency may be measured in response to the sorption and/or desorption of one or more chemical species. A change in electrical resistance may be measured in response to the sorption and/or desorption of one or more chemical species. The electronic properties that may be monitored and/or measured include, but are not limited to, one or more of resonance frequency, capacitance, resistance, conductance, and impedance, among others.

In some embodiments, the detecting proceeds at about room temperature. In some embodiments, the detecting includes detecting $SO_2$ optionally in the presence of $H_2O$. In some embodiments, the detecting includes detecting between 25 ppm $SO_2$ to about 500 ppm $SO_2$ in the environment. In some embodiments, the detecting includes detecting $CO_2$ optionally in the presence of $H_2O$. In some embodiments, the detecting includes detecting between about 400 ppm of $CO_2$ and 5000 ppm of $CO_2$ in the environment. In some embodiments, the detecting includes detecting $H_2O$ optionally in the presence of $CO_2$. In some embodiments, the detecting includes detecting relative humidity levels in the environment below about 40% RH and/or greater than about 60% RH. In some embodiments, the sensor is a capacitive sensor comprising an interdigitated electrode, wherein the sensing layer is deposited on the interdigitated electrode of the capacitive sensor, wherein the presence of one or more of $SO_2$, $CO_2$, and $H_2O$ is detected by measuring a change in capacitance in the sensing layer. In some embodiments, the sensor is a QCM sensor comprising an electrode, wherein the sensing layer is deposited on the electrode of the QCM, wherein the presence of one or more of $SO_2$, $CO_2$, and $H_2O$ is detected by measuring a change in resonance frequency in the sensing layer.

The step 403 is optional and includes regenerating the sensor. The regenerating may include thermal treatment in a vacuum and/or inert gas environment (e.g., under nitrogen). For example, in an embodiment, the regenerating may include heating to or at a temperature of about 105° C. in a vacuum. In an embodiment, the regenerating may include heating to or at a temperature of about 105° C. in an inert gas environment. In other embodiments, the temperature of regenerating may be less than and/or greater than about 105° C.

Figure 5:
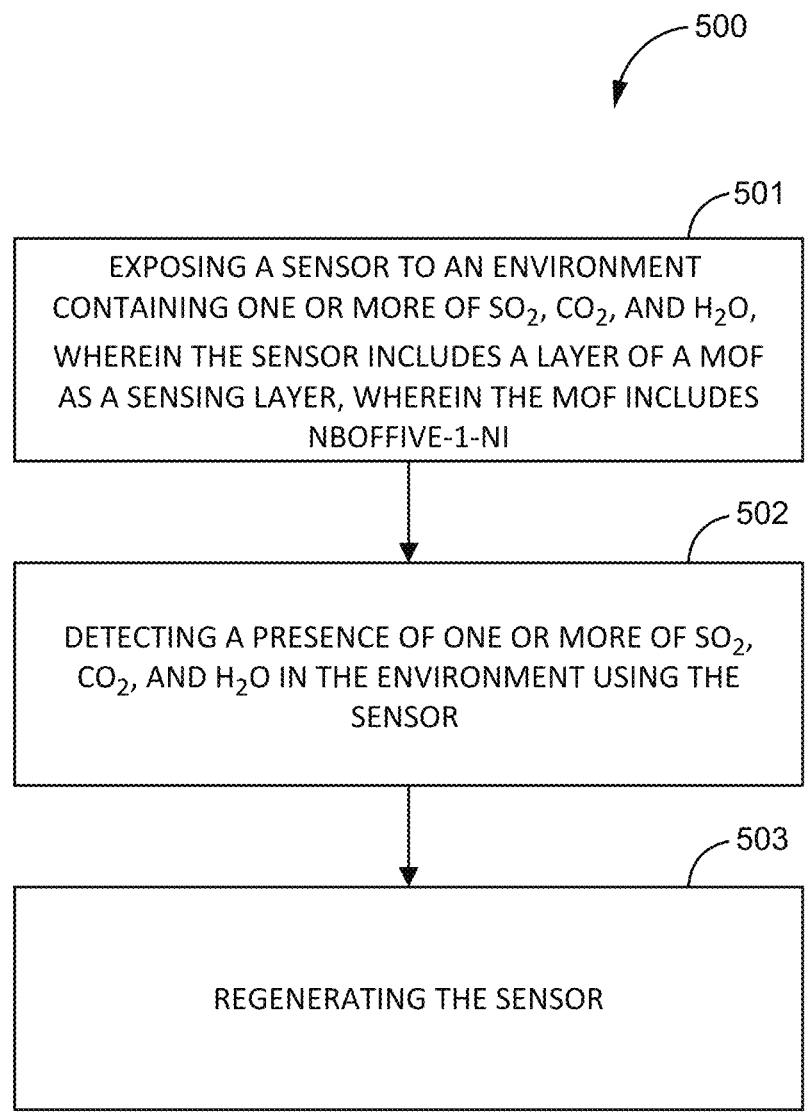
FIG. 5 is a flowchart of a method of sensing using NbOFFIVE-1-Ni, according to one or more embodiments of the present disclosure.

FIG. 5 is a flowchart of a method of sensing using a sensor based on NbOFFIVE-1-Ni, according to one or more embodiments of the present disclosure. As shown in FIG. 5, the method may comprise exposing 501 a sensor to an environment containing one or more of $SO_2$, $CO_2$, and $H_2O$, wherein the sensor includes a layer of a metal-organic framework as a sensing layer; wherein the metal-organic framework is characterized by $NiNbOF_5(pyrazine)_2 \cdot x(solv)$; detecting 502 a presence of one or more of $SO_2$, $CO_2$, and $H_2O$ in the environment using the sensor; and optionally regenerating 503 the sensor.

Figure 6:
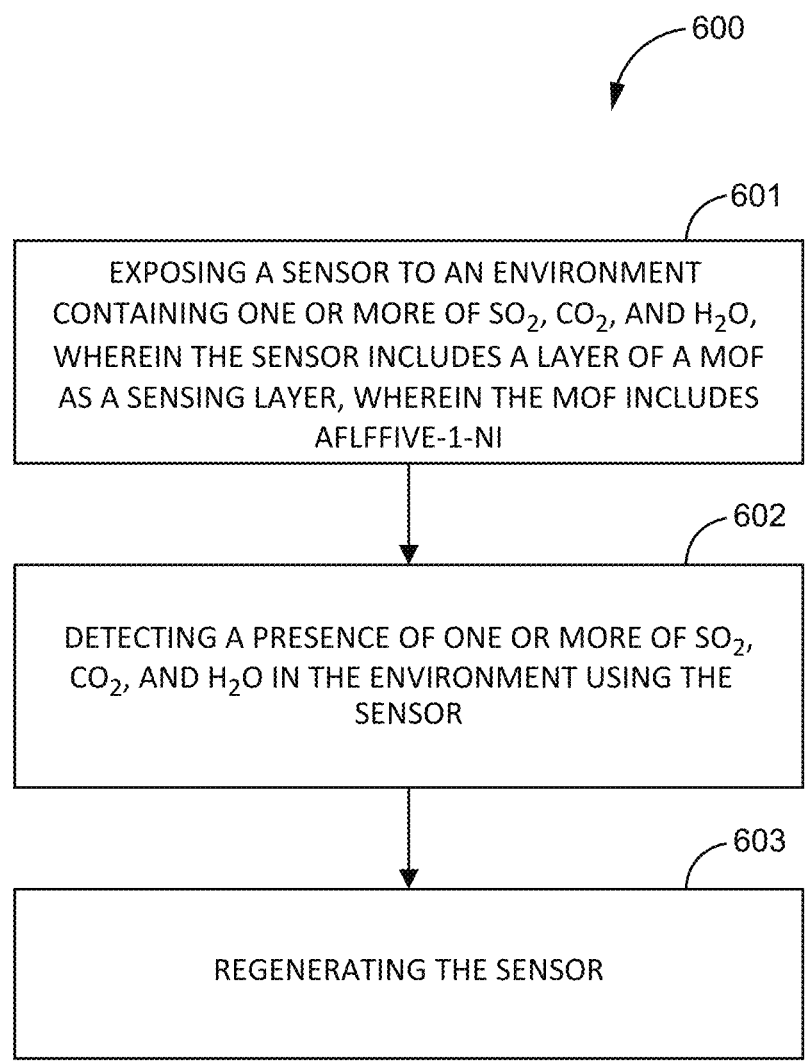
FIG. 6 is a flowchart of a method of AlFFIVE-1-Ni, according to one or more embodiments of the present disclosure.

FIG. 6 is a flowchart of a method of sensing using a sensor based on AlFFIVE-1-Ni, according to one or more embodiments of the present disclosure. As shown in FIG. 6, the method 600 may comprise exposing 601 a sensor to an environment containing one or more of $SO_2$, $CO_2$, and $H_2O$, wherein the sensor includes a layer of a metal-organic framework as a sensing layer; wherein the metal-organic framework is characterized by $NiAlF_5(H_2O)(pyrazine)_2 \cdot x(solv)$; detecting 602 a presence of one or more of $SO_2$, $CO_2$, and $H_2O$ in the environment using the sensor; and optionally regenerating 603 the sensor.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

Fluorinated MOF Platform to Address the Highly Challenging Selective Removal and Sensing of $SO_2$ from Flue Gas and Air The present Example relates to the use of isostructural fluorinated MOFs for (i) selective removal of $SO_2$ from synthetic flue gas and (ii) sensing of $SO_2$ using QCM as a transducer since the coating of MOFs on the QCM electrodes can detect the change in mass of sub nanograms upon adsorption or desorption of molecules by the MOF layer. The present Example describes an unprecedented concurrent removal of $SO_2/CO_2$ from synthetic flue gas and remarkable detection capability in ppm level of $SO_2$ concentration in both dry and humid conditions.

Conventional $SO_2$ scrubber agents, namely calcium oxide and zeolites, are often used to remove $SO_2$ utilizing a strong/irreversible adsorption-based process. However, adsorbents capable of sensing and selectively capturing this toxic molecule with reversibility have yet to be explored. The present Example describes novel selective removal and sensing of $SO_2$ using fluorinated metal-organic frameworks (MOFs). Single/mixed gas adsorption experiments were performed at low concentrations ranging from about 100 ppm to about 7% of $SO_2$. Direct mixed column breakthrough and/or indirect mixed column breakthrough desorption experiments revealed an unprecedented $SO_2$ affinity for NbOFFIVE-1-Ni and AlFFIVE-1-Ni MOFs. Furthermore, MOF-coated quartz crystal microbalance (QCM) transducers were used to develop sensors with the ability to detect $SO_2$ at low concentrations ranging from about 25 to about 500 ppm.

Methods and Procedures

Column Breakthrough Test Set-up, Procedure, and Measurements

Figure 7:
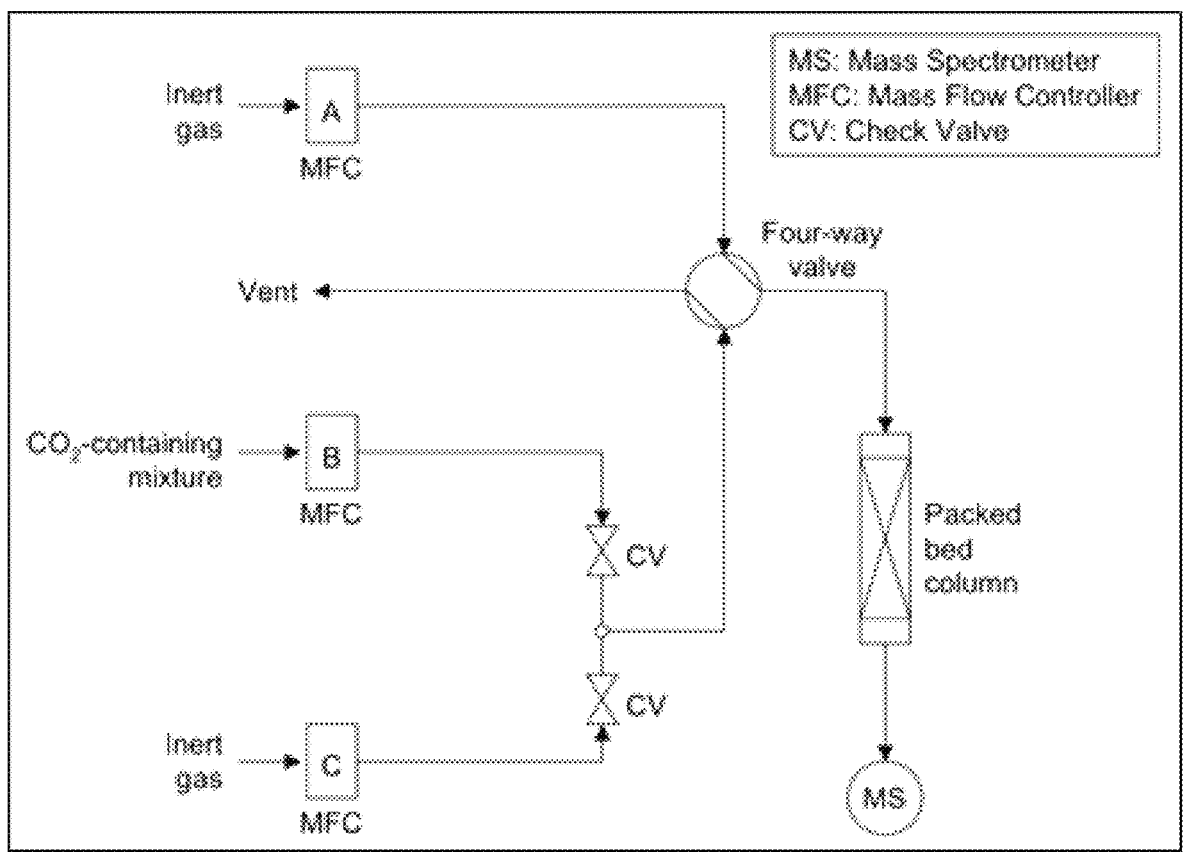
FIG. 7 is a schematic diagram showing the column breakthrough set-up, according to one or more embodiments of the present disclosure.

The experimental set-up used for dynamic breakthrough measurements is shown in FIG. 7. The gas manifold consisted of three lines fitted with mass flow controllers. Line "A" was used to feed an inert gas, most commonly helium, to activate the sample before each experiment. The other two lines, "B" and "C" fed pure or pre-mixed gases. Whenever required, gases flowing through lines "B" and "C" were mixed before entering a column packed with the sample using a four-way valve. In a typical experiment, about 300-500 mg of adsorbent (in the column) was treated in situ at required temperature under He flow (about 50 cm³/g) for about 8 hours.

Before starting each experiment, helium reference gas was flushed through the column and then the gas flow was switched to the desired gas mixture at the same flow rate between about 10-40 cm³/g. The gas mixture downstream the column was monitored using a Hiden mass-spectrometer.

After water saturation (as detected by mass spectrometer), humid He flow was allowed to continue for two more hours. At this point gas flow was changed to about 500 ppm $SO_2$ with balance $N_2$ (dry, about 23 cc/min flow rate) for about two hours. Adsorbed phase was analyzed by TPD experiment by increasing the temperature of the column under He flow (about 15 cc/min). The TPD experiment results showed that in case of NbOFFIVE-1-Ni, $SO_2$ was able to replace adsorbed water relatively more easily than AlFFIVE-1-Ni.

The results were on expected line considering relative water affinity of both the compound and further support trend in sensing experiments.

Fabrication of NbOFFIVE-1-Ni and AlFFIVE-1-Ni Coated QCM:

The transducer was a 10 MHz AT-cut piezoelectric quartz crystal quartz microbalance (QCM) device with a thickness shear mode and placed between two gold electrodes for electrical connection. The QCM was rinsed with ethanol and dried in air. MOFs paste was then applied to the electrode of QCMs by spin-coating method (2 μm thick) no prior modification of the sensors surface was required.

The QCM sensor was then fixed in a sealed chamber. Prior to measurements the fresh coated MOFs film was activated in situ for about 4 hours to have a guest free framework. The resulting coatings were ultrathin and reproducible so that the stress upon absorption of $SO_2$ inducing a change in the mass change of the thin film was effective.

Figure 8:
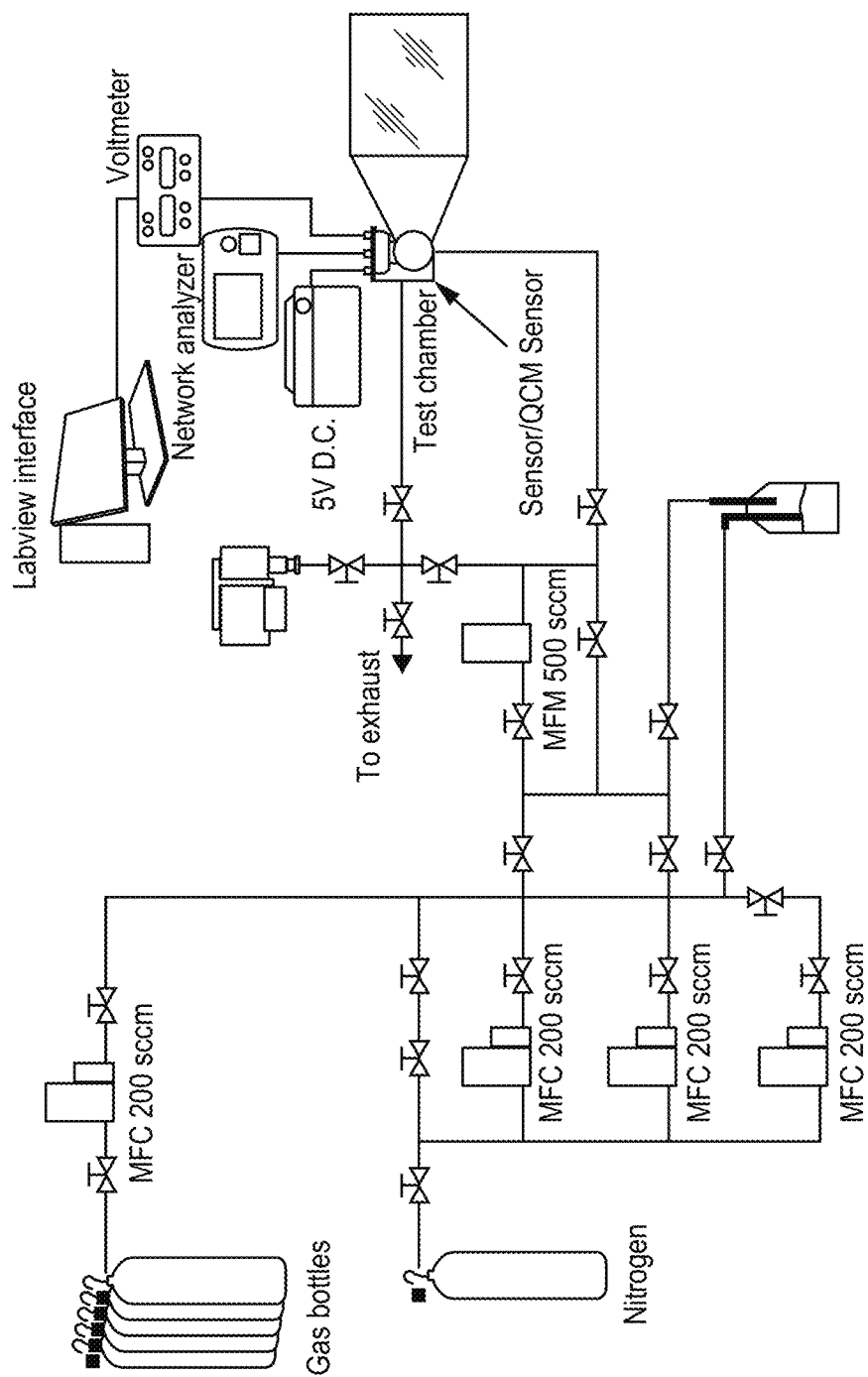
FIG. 8 is a schematic diagram showing gas flow control and dilution system and sensor measurement set-up, according to one or more embodiments of the present disclosure.

Apparatus:

FIG. 8 shows the sensing set-up used in this Example for real-time measurement. All the sensor measurements were carried out at about room temperature, under a dry air total stream of about 200 sccm. MFCs (Mass flow controllers) from Alicat scientific Inc. were used to control the flow rate for gases coming from certified bottles. Stainless steel delivery lines or perfluoroalkoxy alkane, PFA tubing (in regions requiring flexibility and resistivity to VOCs) were used on the setup with Vernier metering valves (from Swagelok) as a flow regulator. To detect the change in humidity level inside the chamber a commercial humidity sensor (Honeywell HIH-4000-003) was used as a reference which has an error less than about 0.5% RH. The QCM sensor was exposed to the analyte stream until a stable response was obtained, a two-port network (Keysight E5071C ENA) circuit was used to monitor the change in resonance frequency. A LabVIEW interface was used for synchronization and data acquisition by controlling the LCR meter and the multimeter. Hence, the possibility of data loss was minimized.

Results and Discussion

Figures 9A, 9B, 9C:
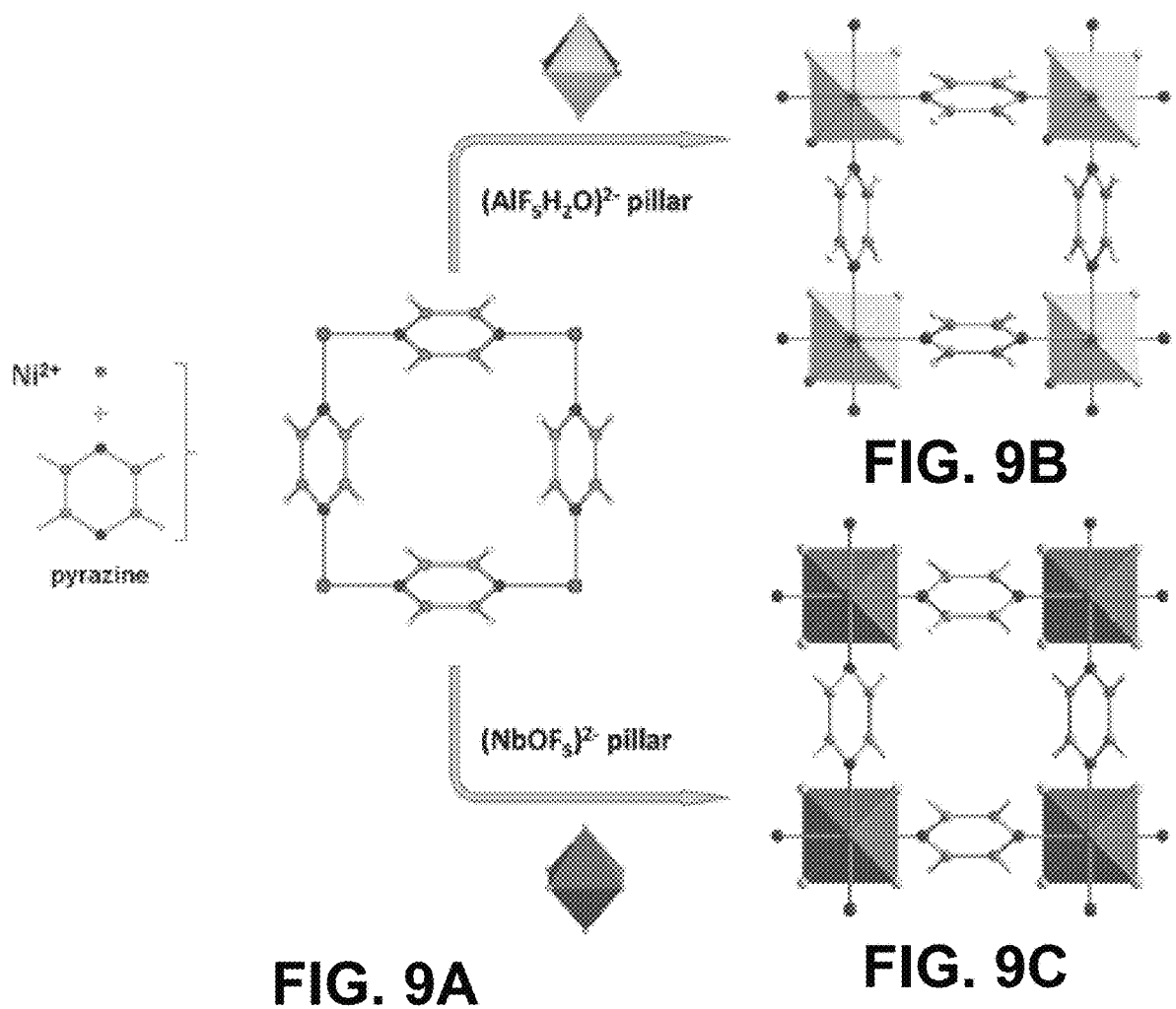
FIGS. 9A-9C is a schematic diagram showing crystal structure details for NbOFFIVE-1-Ni and AlFFIVE-1-Ni: (a) Square grid resulting from the connection of Ni$^{2+}$ cations and pyrazine that are further pillared by either (b) (AlF$_5$(H$_2$O))$^{2-}$ pillar or (c) (NbOF$_5$)$^{2-}$ pillar, according to one or more embodiments of the present disclosure.

The fluorinated MOF platforms, namely NbOFFIVE-1-Ni and AlFFIVE-1-Ni, resulted in many desirable properties. Although both of the MOFs are isostructural, the subtle differences in their chemical compositions, $(NbOF_5)^{2-}$ instead of $AlF_5(H_2O)^{2-}$, allowed the modulation of their properties by varying the content and intermolecular spacing of pending fluoride groups realized via different tilts of pyrazine molecules (FIGS. 9A-9C). In view of the excellent stability and the modular nature of these MOF materials, their use for $SO_2$ removal and sensing in synthetic flue gas and air, respectively, was investigated.

$SO_2$ Removal from Flue Gas

Figure 10:
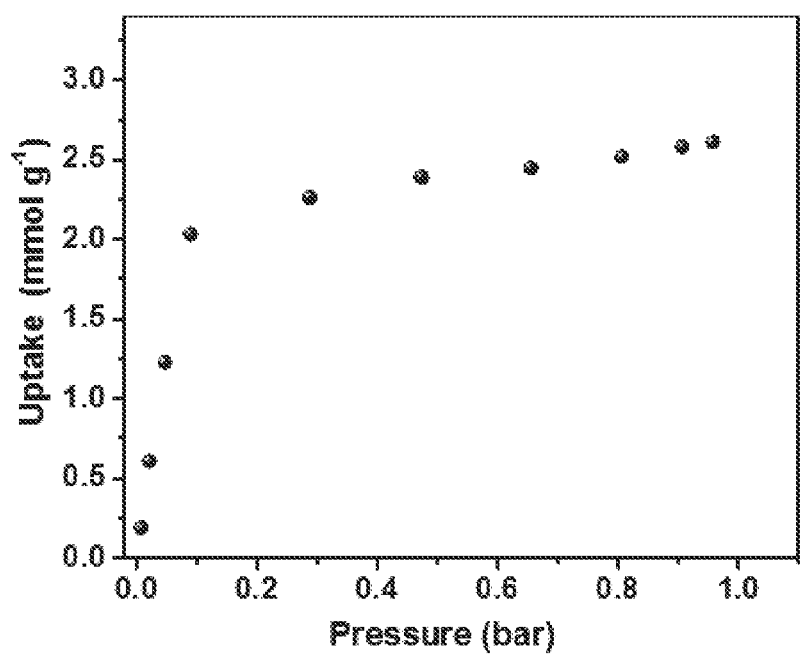
FIG. 10 is a graphical view of SO$_2$ isotherm for NbOFFIVE-1-Ni at 25° C. after 105° C. activation, according to one or more embodiments of the present disclosure.
Figure 11A:
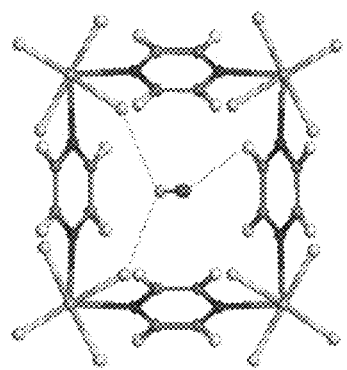
FIGS. 11A-11D are schematic diagrams showing local views for the DFT-geometry optimized guest loaded-crystal structures: (a) SO$_2$ and (b) CO$_2$— loaded in NbOFFIVE-1-Ni, (c) SO$_2$ and (d) CO$_2$— loaded in AlFFIVE-1-Ni (Color code: Aluminum (pink), niobium (green), nickel (steel blue), fluorine (light green), nitrogen (blue), carbon (gray), hydrogen (white), oxygen (red), and sulfur (yellow)), according to one or more embodiments of the present disclosure.
Figure 11C:
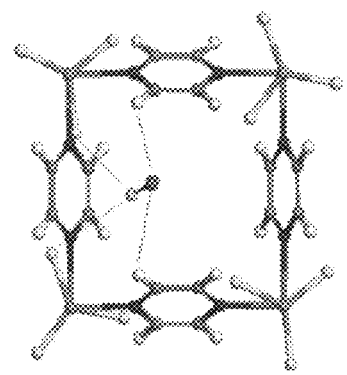
Figure 11B:
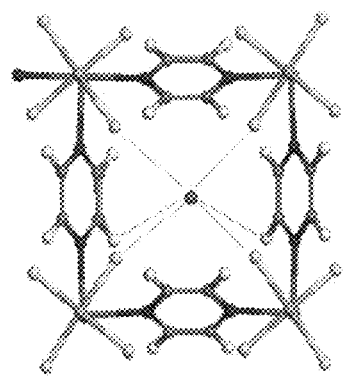

NbOFFIVE-1-Ni was first investigated for $SO_2$ sorption. The steep, pure $SO_2$ adsorption isotherm collected at about 25° C. (FIG. 10) suggested a high affinity of the NbOFFIVE-1-Ni framework for $SO_2$. This observation was corroborated by Density Functional Theory (DFT) calculations, which revealed high $SO_2$/NbOFFIVE-1-Ni interaction energy of about −64.8 kJ/mol. This was due to a relatively stronger interaction between the sulfur atom of $SO_2$ and the F-pillars with characteristic interatomic distances of about 2.9 Å (FIG. 11A) along with a charge transfer between the guest and this region of the MOF. Interestingly, the $SO_2$/NbOFFIVE-1-Ni interaction energy was similar to the value calculated for $CO_2$ (about −54.5 kJ/mol). This latter molecule occupied slightly different sites than $SO_2$, implying an interaction of the guest molecule with both the F-pillars and the pyrazine groups (FIG. 11B). The so-predicted energetics for a single gas behavior suggested simultaneous capture of $SO_2$ and $CO_2$.

Figure 13:
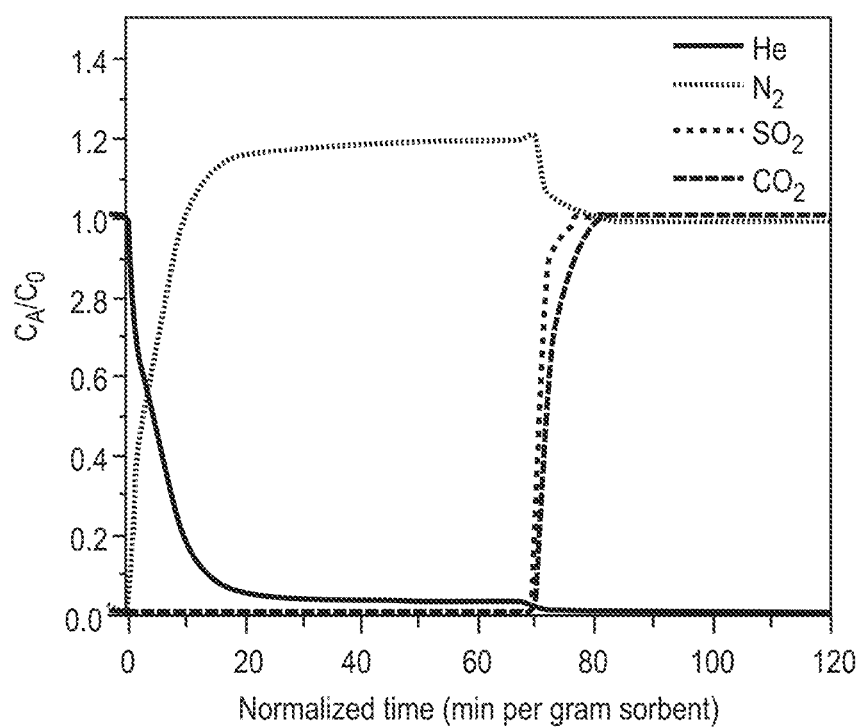
FIG. 13 is a graphical view showing NbOFFIVE-1-Ni breakthrough experiments for 4% CO$_2$, 4% SO$_2$ (balance N$_2$), according to one or more embodiments of the present disclosure.

Cyclic adsorption column breakthrough tests with $SO_2$/$N_2$:7/93 indicate stability and good uptake (≈2.2 mmol/g) of $SO_2$ (FIGS. 12A-12D). Furthermore, adsorption column breakthrough experiments with $SO_2$/$CO_2$/$N_2$: 4/4/92 gas mixture showed simultaneous and equal retention time in the column for $SO_2$ and $CO_2$, demonstrating identical uptake of ≈1.1 mmol/g (FIG. 13), which was consistent with the simulated energetics trends. Upon decreasing the $SO_2$ concentration with nitrogen in the range commonly observed in flue gas (500 ppm) ($SO_2$/$N_2$: 0.05/99.95 mixture), NbOFFIVE-1-Ni maintained a high $SO_2$ uptake of about 1.4 mmol/g. Interestingly, adsorption column breakthrough experiments under mimicked flue gas conditions with about 500 ppm of $SO_2$ and about 10% $CO_2$ in $N_2$ ($SO_2$/$CO_2$/$N_2$: 0.05/10/89.95) resulted in equal and simultaneous retention time for both $SO_2$ and $CO_2$, leading to uptakes of ≈0.01 mmol/g and ≈2.2 mmol/g, respectively. This direct co-adsorption experiment demonstrated that NbOFFIVE-1-Ni exhibited equal selectivity toward $SO_2$ and $CO_2$, which is desirable for simultaneous $CO_2$ and $SO_2$ capture in flue gas (containing low $SO_2$ concentrations). Nevertheless, temperature-programmed desorption (TPD) confirmed the presence of $CO_2$ only with an undetectable amount of $SO_2$ (FIG. 12D) in the adsorbed phase as the amount of $SO_2$ adsorbed was negligible owing to its low concentration.

Figure 11D:
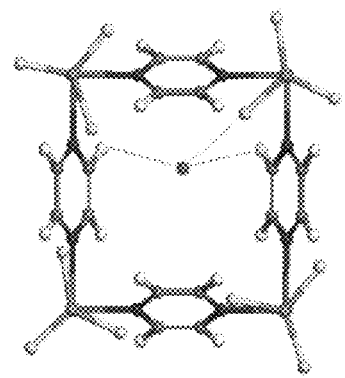
Figure 12A:
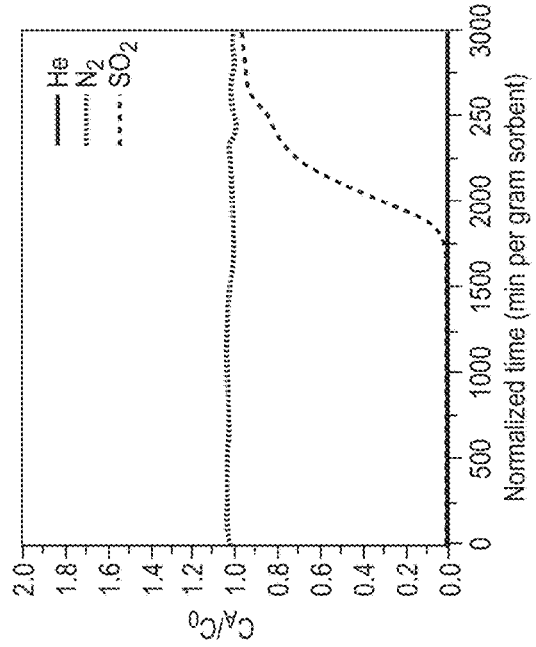
FIGS. 12A-12D are graphical views showing NbOFFIVE-1-Ni adsorption column breakthrough experiments for (a) SO$_2$/N$_2$: 7/93 mixture (10 cc/min, flow rate), (b) SO$_2$/N$_2$: 0.05/99.95 mixture (40 cc/min, flow rate), and (c) SO$_2$/CO$_2$/N$_2$: 0.05/10/89.95 mixture (25 cc/min, flow rate); (d) Temperature-programed desorption after initial adsorption in the column using a mixture akin to flue gas (SO$_2$/CO$_2$/N$_2$: 0.05/10/89.95), suggesting an adsorbed phase composition dominated by CO$_2$, according to one or more embodiments of the present disclosure.
Figure 12B:
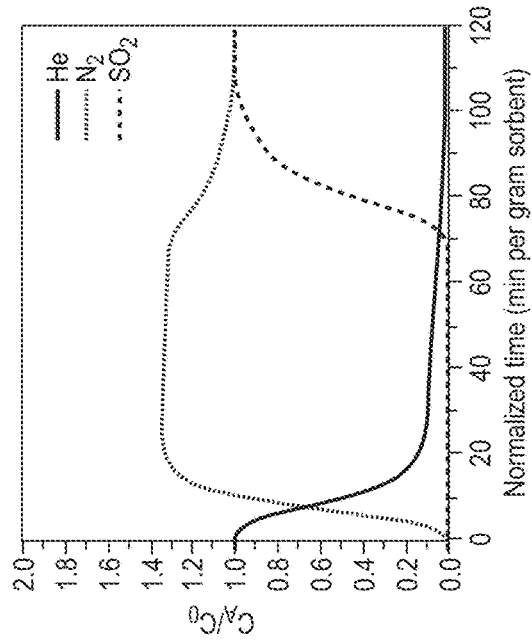
Figure 12C:
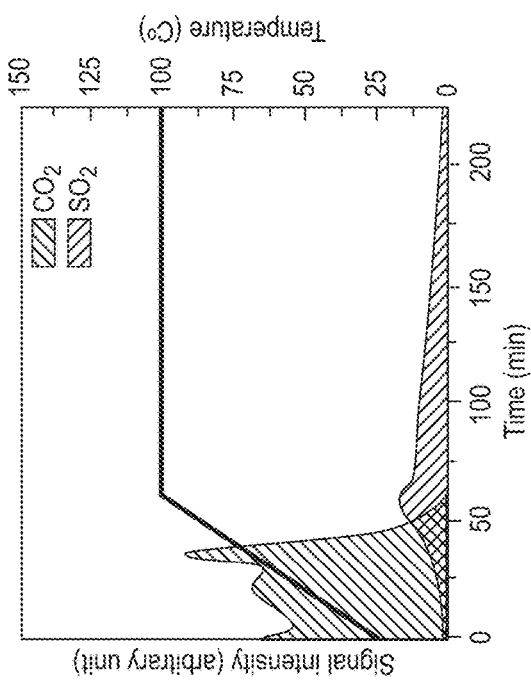
Figure 12D:
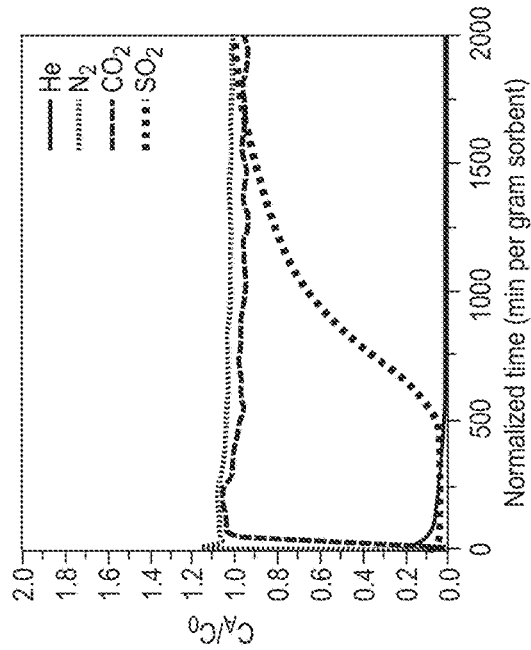

In the quest for a material with more favorable selectivity for $SO_2$ removal from flue gas than $CO_2$ (at 500 ppm of $SO_2$), an analogue of NbOFFIVE-1-Ni with lower $CO_2$ interactions and potentially higher $SO_2$ interactions was investigated. In particular, AlFFIVE-1-Ni was explored for the structural $SO_2$/$CO_2$ co-adsorption property. AlFFIVE-1-Ni exhibited three pendant fluoride groups with slightly higher F . . . F distance (3.613 Å) and one potential open metal site, whereas NbOFFIVE-1-Ni contained four pendants fluoride with smaller F . . . F distance (3.210(8) Å) and no open metal site. Such minute differences in structural features led to a discovery of equal selectivity for $CO_2$ and $H_2S$ over a wide range of concentrations and temperatures. Encouraged by this structure-property tuning of $H_2S$ and $CO_2$ adsorption affinity using this MOF, AlFFIVE-1-Ni was expected to be more selective toward $SO_2$ than $CO_2$. The DFT calculations first revealed a lowering of the host/guest interaction energy of $CO_2$ for AlFFIVE-1-Ni compared to NbOFFIVE-1-Ni (−47.0 kJ/mol vs. −54.5 kJ/mol). In the case of AlFFIVE-1-Ni, the trigonal bipyramidal-like $Al^{3+}$ environment did not allow for further optimal interactions between a carbon atom in $CO_2$ and four F-pillars (FIG. 11D), as seen in NbOFFIVE-1-Ni. Interestingly, the simulated preferential location of $SO_2$ was slightly pushed toward the pore wall, as compared to the scenario in NbOFFIVE-1-Ni, with the formation of a dual interaction between its sulfur atoms and the two nearby F-pillars as well as its oxygen atoms interacting with the pyrazine linker with shorter interacting distances (FIG. 11C). The resulting geometry led to a slight enhancement of the $SO_2$/host interaction energy (−67.3 kJ/mol) and reduced affinity toward $CO_2$, making AlFFIVE-1-Ni a promising candidate to selectively adsorb $SO_2$ over $CO_2$.

Figure 14:
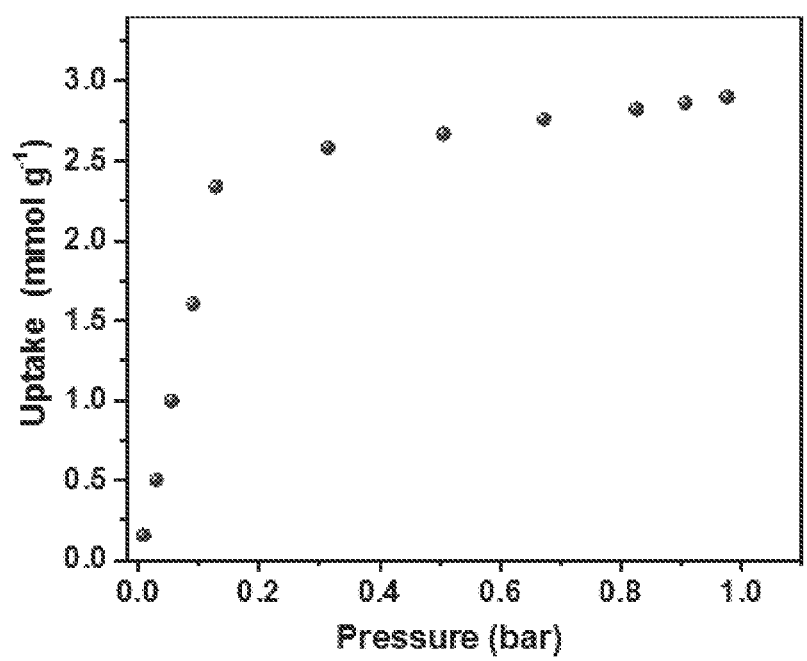
FIG. 14 is a graphical view of SO$_2$ isotherm for AlFFIVE-1-Ni at 25° C. after 105° C. activation, according to one or more embodiments of the present disclosure.
Figure 16:
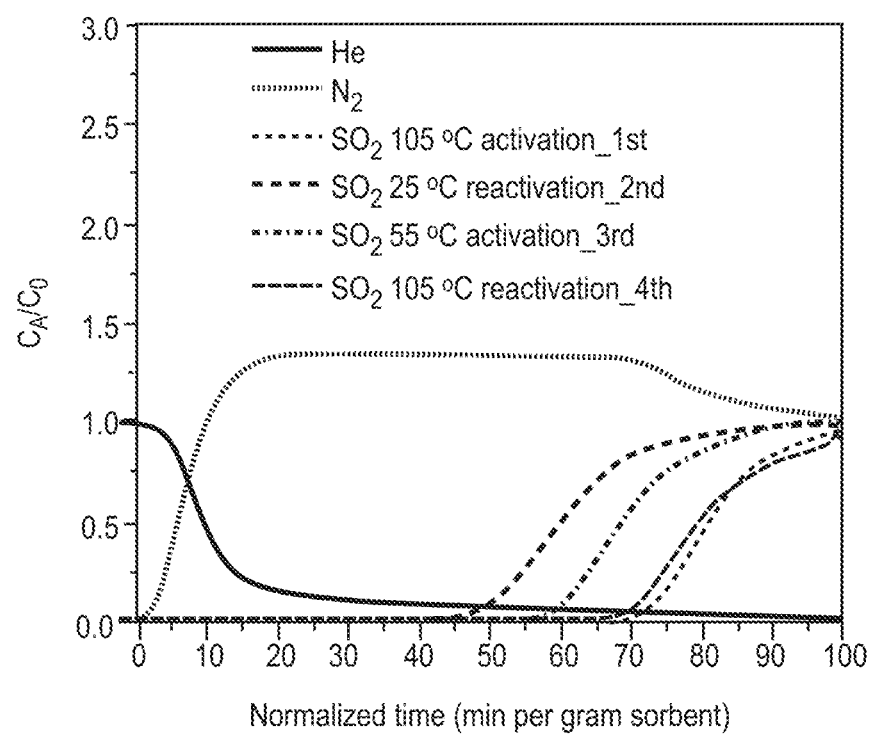
FIG. 16 is a graphical view showing AlFFIVE-1-Ni breakthrough experiments for 7% SO$_2$ (balance N$_2$) and optimization of regeneration temperature, according to one or more embodiments of the present disclosure.
Figure 17:
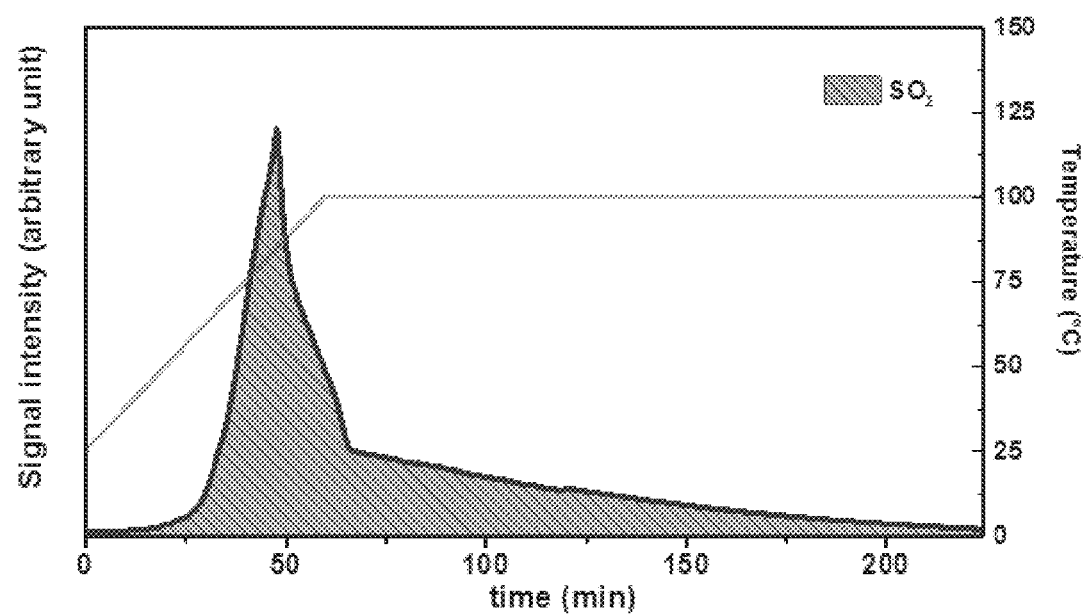
FIG. 17 is a graphical view showing TPD analysis of adsorbed phase for AlFFIVE-1-Ni after breakthrough experiments with 500 ppm SO$_2$ (balance N$_2$), according to one or more embodiments of the present disclosure.

Investigation of single $SO_2$ adsorption showed that AlFFIVE-1-Ni also exhibited a steep adsorption isotherm at about 25° C. (FIG. 14). The corresponding adsorption column breakthrough experiment with $SO_2$/$N_2$: 7/93 mixture showed a high uptake of about 2.2 mmol/g (FIGS. 15A-15D). AlFFIVE-1-Ni can be completely regenerated by heating at about 105° C. in a vacuum or inert gas environment (FIG. 16). During the adsorption column breakthrough experiments carried out with low $SO_2$ ($SO_2$/$N_2$: 0.05/99.95) mixture, AlFFIVE-1-Ni still maintained a high uptake of $SO_2$ (about 1.6 mmol/g). Subsequent TPD analysis of the adsorbed phase confirmed the adsorption of $SO_2$ (FIG. 17) at ppm level. Adsorption column breakthrough experiments with synthetic flue gas using a $SO_2$/$CO_2$/$N_2$: 0.05/10/89.95 mixture showed that $SO_2$ continues to be adsorbed for long durations past the $CO_2$ breakthrough. This indicated that the adsorbed $CO_2$ was replaced by $SO_2$ from the gas mixture, which was consistent with a much higher estimated interaction energy of $SO_2$ over $CO_2$. Subsequent TPD analysis suggested an adsorbed phase composition of about 1.5 mmol/g for $CO_2$ and about 0.5 mmol/g for $SO_2$, which was remarkable considering the large difference in concentrations of $CO_2$ and $SO_2$ in the synthetic flue gas (FIG. 15D). A selectivity of $SO_2$/$CO_2$≈66 showed that AlFFIVE-1-Ni was one of the most efficient materials for $SO_2$ removal at a ppm level and is promising for selectively removing $SO_2$ from flue gas.

Selective $SO_2$ Detection from the Air

From the adsorptive separation study above, AlFFIVE-1-Ni and NbOFFIVE-1-Ni were shown to exhibit tunable $CO_2$/$H_2S$ selectivity, molecules that are present in environments contaminated with $SO_2$. To benefit from the outstanding properties of this platform, the feasibility of depositing AlFFIVE-1-Ni and NbOFFIVE-1-Ni on a QCM electrode and unveiling their $SO_2$ sensing properties in the presence and absence of humidity to mimic atmospheric conditions were explored.

Figure 18A:
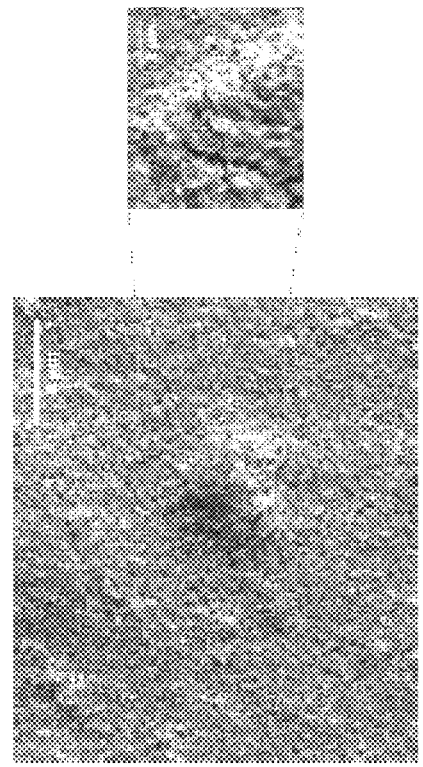
FIGS. 18A-18B are SEM micrographs at a high and low magnification of (a) NbOFFIVE-1-Ni and (b) AlFFIVE-1-Ni thin films coated on the gold electrode of QCM, according to one or more embodiments of the present disclosure.
Figure 18B:
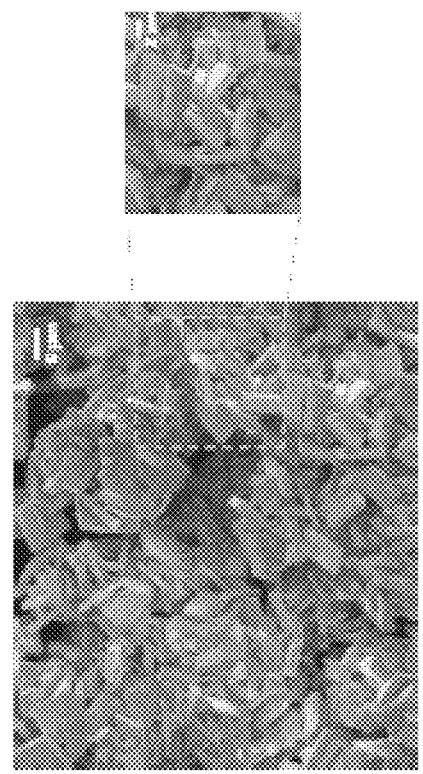

The surface morphology of AlFFIVE-1-Ni and NbOFFIVE-1-Ni coated on QCM (see inset) was studied using scanning electron microscopy (SEM). The thin films of both MOFs were found to be compact and uniform. The densely packed MOFs crystals were uniformly deposited on the QCM substrate with low intergranular voids and random orientation. As illustrated in FIGS. 18A-18B, the coating of NbOFFIVE-1-Ni led to cubic crystallites of approximately 150 nm, while for the AlFFIVE-1-Ni films, the size of the crystallites was significantly larger at ~30 μm. Powder X-ray diffraction experiments were carried out to confirm the purity and crystallinity of the deposited MOFs (FIGS. 19A-19B).

Figure 20:
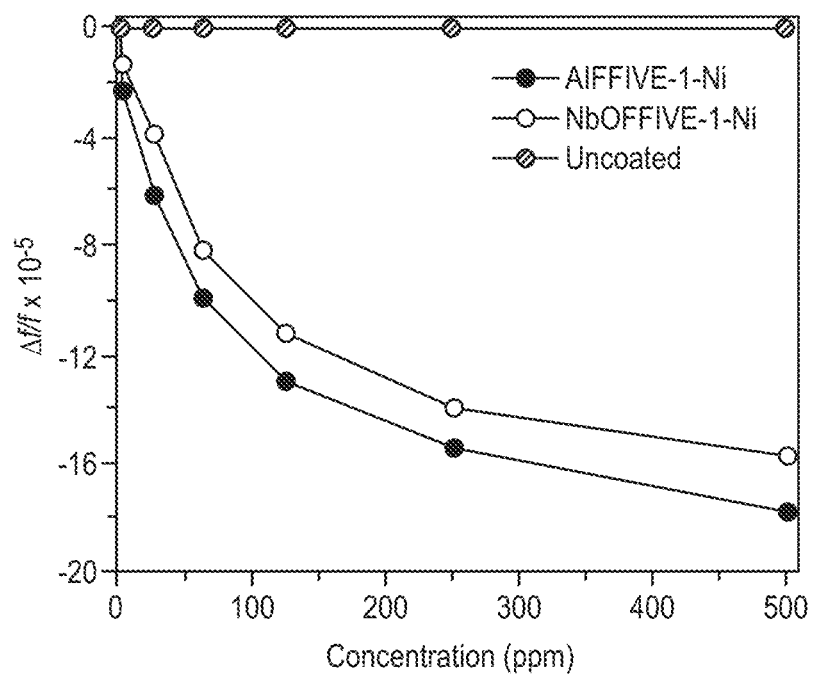
FIG. 20 is a graphical view showing frequency shift comparison as a function of the $SO_2$ concentration for the uncoated and NbOFFIVE-1-Ni or AlFFIVE-1-Ni coated QCM sensors, according to one or more embodiments of the present disclosure.

The sensitivity (Δf/f)) of AlFFIVE-1-Ni and NbOFFIVE-1-Ni coated QCM devices were measured for different concentrations of $SO_2$, ranging from 0 to 500 ppm in nitrogen. Uncoated QCM showed a negligible response to $SO_2$. With the increase in the concentration of $SO_2$, both MOF-coated sensors responded with a nonlinear decrease in sensitivity (FIG. 20) and (FIGS. 21A-21B). After each exposure cycle, the device was in situ heated at about 105° C. in ambient nitrogen for about four hours, which reactivated the MOF thin films for sensing.

Figure 22:
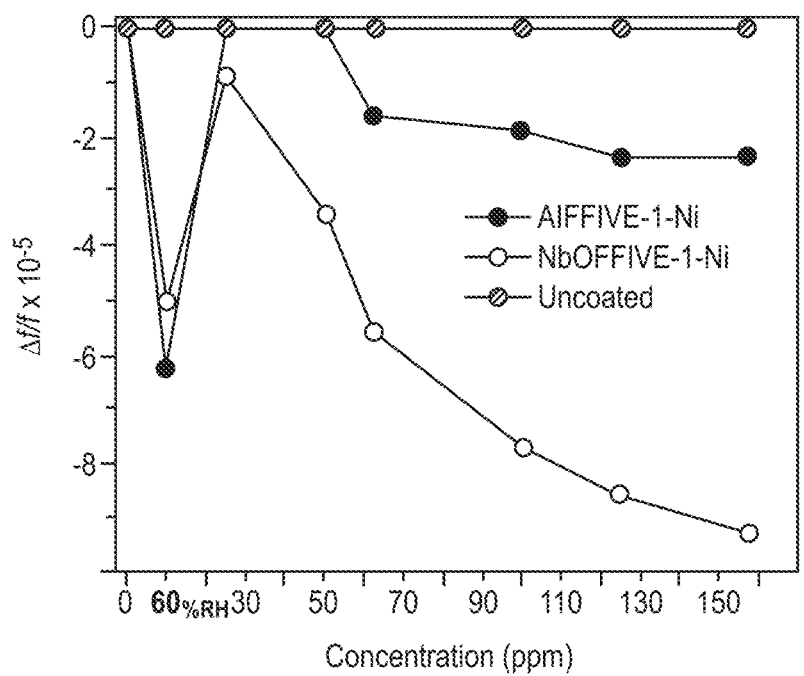
FIG. 22 is a graphical view showing plots of sensors' responses as a function of $SO_2$ concentration in synthetic air, according to one or more embodiments of the present disclosure.

Humidity is present in most environments, and so it was important to understand a sensor's response in its presence. Therefore, mixed gas experiments were performed, exposing NbOFFIVE-1-Ni and AlFFIVE-1-Ni to $SO_2$ in humid conditions mimicking real-world conditions. FIG. 22 shows the sensor sensitivity as a function of $SO_2$ concentration in humid conditions (60% RH) at room temperature for uncoated and coated NbOFFIVE-1-Ni, AlFFIVE-1-Ni QCMs. Uncoated QCM had a near zero response to humidity and $SO_2$. This corroborated that the sensing response to $SO_2$ under humid conditions was due to its affinity to NbOFFIVE-1-Ni and AlFFIVE-1-Ni films.

Figure 23B:
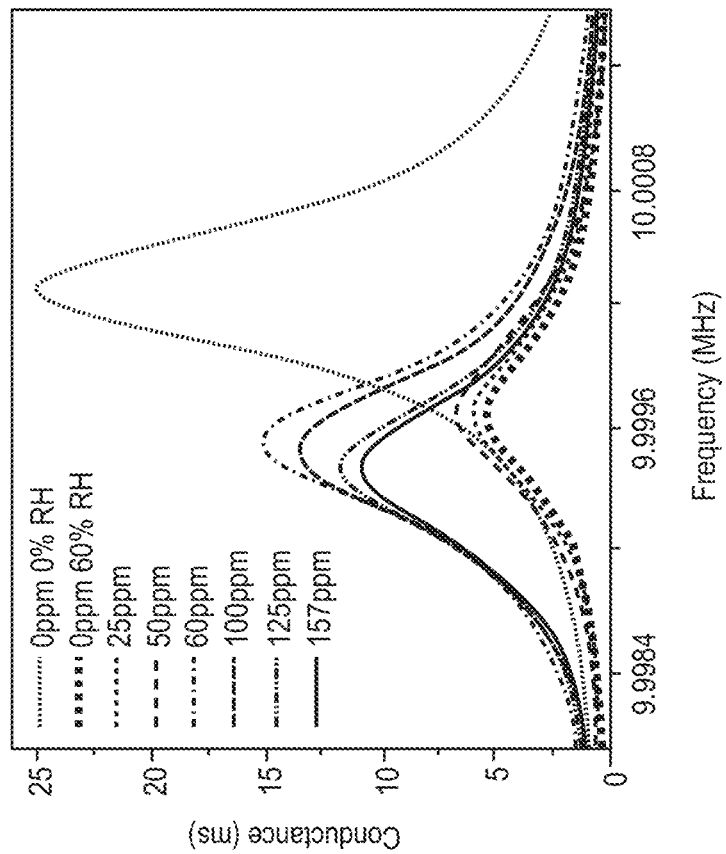
FIGS. 23A-23B are graphical views showing variation of the peak resonance frequency (a) NbOFFIVE-1-Ni (b) AlFFIVE-1-Ni, in response to the introduction of various concentrations of humid $SO_2$, according to one or more embodiments of the present disclosure.
Figure 23A:
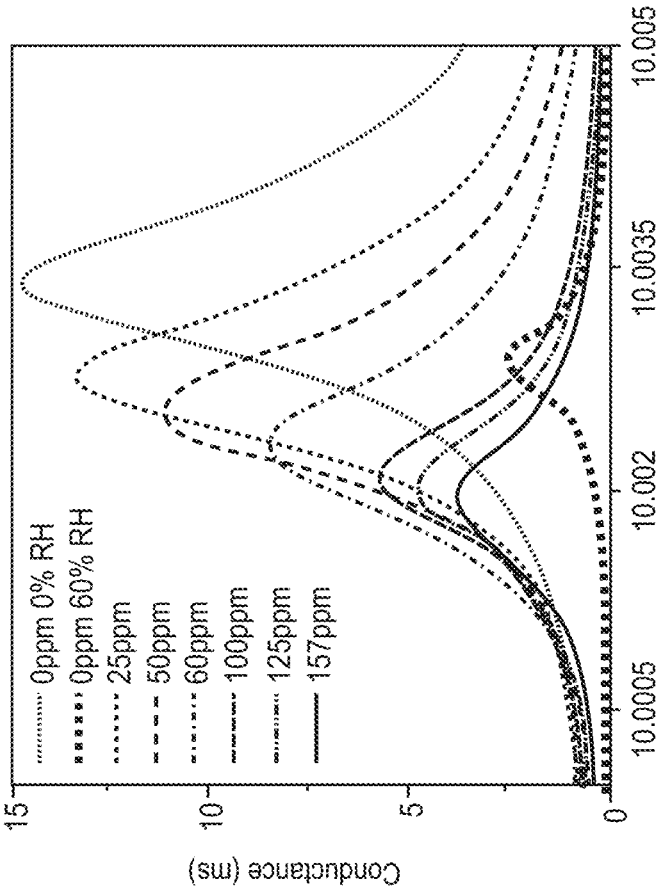

The responses of two kinds of sensors were different. As seen in FIG. 22 and (FIGS. 23A-23B), the resonance frequency of the QCMs initially decreased when the ambience was changed from dry to humid $SO_2$ conditions. The most prominent difference was the inversion in the sensor output due to the introduction of $SO_2$ at 60% RH, but not in the same manner as compared to the dry $SO_2$ case. Interestingly, when exposed to 25 ppm of $SO_2$ in the above-mentioned humid conditions, the sensor resonance frequency for $SO_2$ was reduced. Under humid conditions, the sensitivity of the two MOFs was slightly reduced when compared to dry conditions. However, NbOFFIVE-1-Ni films demonstrated a four-time higher sensitivity toward $SO_2$ in the presence of humidity compared to AlFFIVE-1-Ni.

Figure 24:
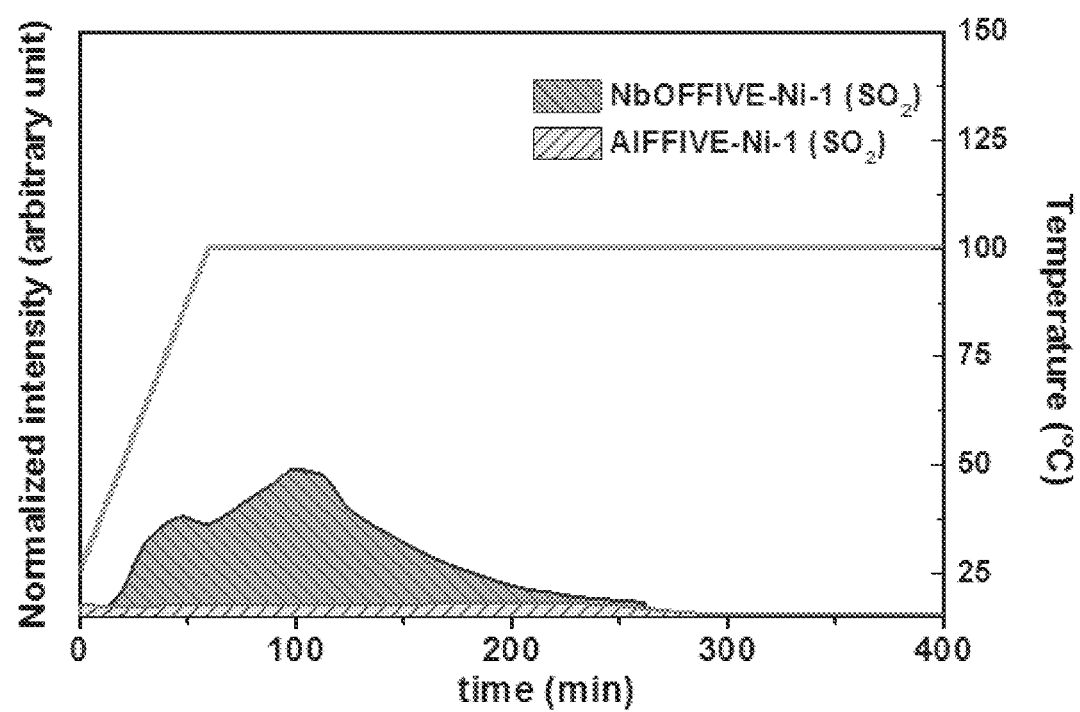
FIG. 24 is a graphical view of temperature-progamed desorption (TPD) of $SO_2$; during typical experiment materials were saturated with water at 60% RH by flowing humid He, according to one or more embodiments of the present disclosure.

To further analyze the results obtained, it was necessary to consider the specific features of the adsorption of $SO_2$ and water on the surface of NbOFFIVE-1-Ni and AlFFIVE-1-Ni. As seen in FIG. 22, the presence of humidity (60% RH) did not significantly affect the NbOFFIVE-1-Ni based sensor's response to the $SO_2$ analyte. This may be due to the affinity of $SO_2$ molecules to replace some of the adsorbed water molecules or/and coexist in the highly confined pores. In the case of AlFFIVE-1-Ni based sensor, which was isomorphic to the NbOFFIVE-1-Ni, lower sensitivity to $SO_2$ in the presence of humidity was observed. Although $SO_2$ has the affinity to replace water molecules, the reduced sensitivity was attributed to the absence of accessible ultramicroporous morphology. The number of $SO_2$ adsorbing active sites was reduced by the pre-adsorbed water, thereby limiting the available space for adsorption. This observation was supported by the fact that the water molecules strongly interacted with $Al^{3+}$ with higher host/guest interaction energy as compared to $SO_2$. The TPD experiment results (FIG. 24) showed that in the case of NbOFFIVE-Ni-1, the adsorbed $SO_2$ was replaced relatively easily with water molecules as compared to the co-adsorption of $SO_2$ and $H_2O$ in AlFFIVE-1-Ni or coexisted with the adsorbed water in the confined pores of NbOFFIVE-Ni-1.

Figure 25B:
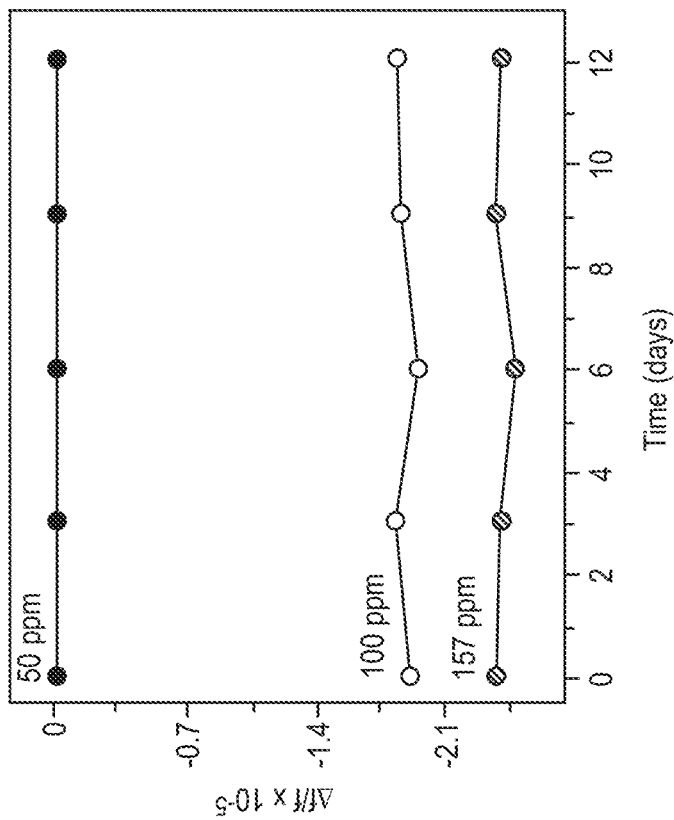
FIGS. 25A-25B are graphical views of long-term stability property of the (a) NbOFFIVE-1-Ni and (b) AlFFIVE-1-Ni sensors exposed to 50, 100, and 157 ppm $SO_2$ gas, according to one or more embodiments of the present disclosure.
Figure 25A:
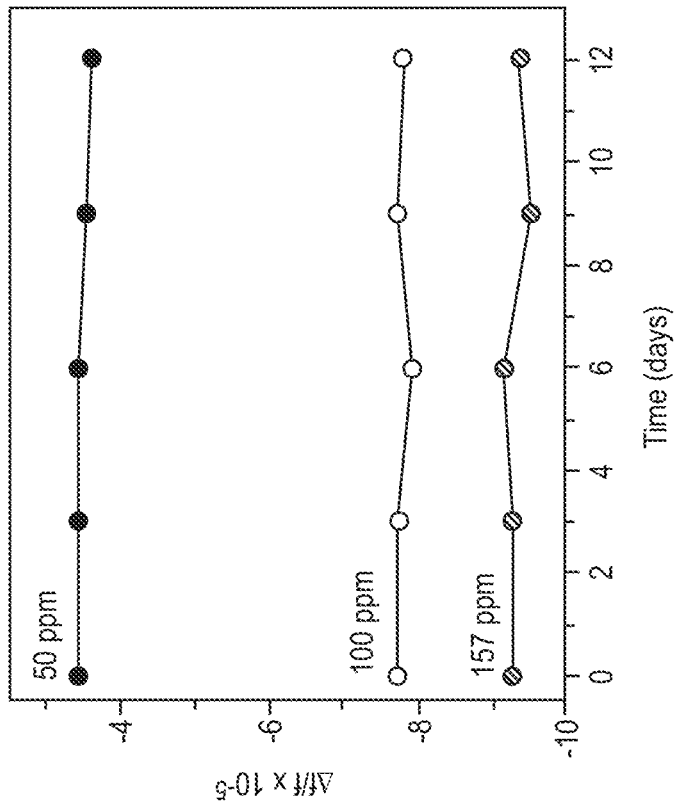

The most important parameters of a sensing device are its stability and reproducibility. These parameters were investigated by cyclic exposure of the sensor to different $SO_2$ concentrations after every forty-eight hours at about room temperature over a period of about twelve days (FIG. 25A-25B). The three results demonstrated the stability of the sensors exposed to about 50, 100, and 157 ppm $SO_2$ gas with no significant change in the resonant frequency over time.

Figure 26:
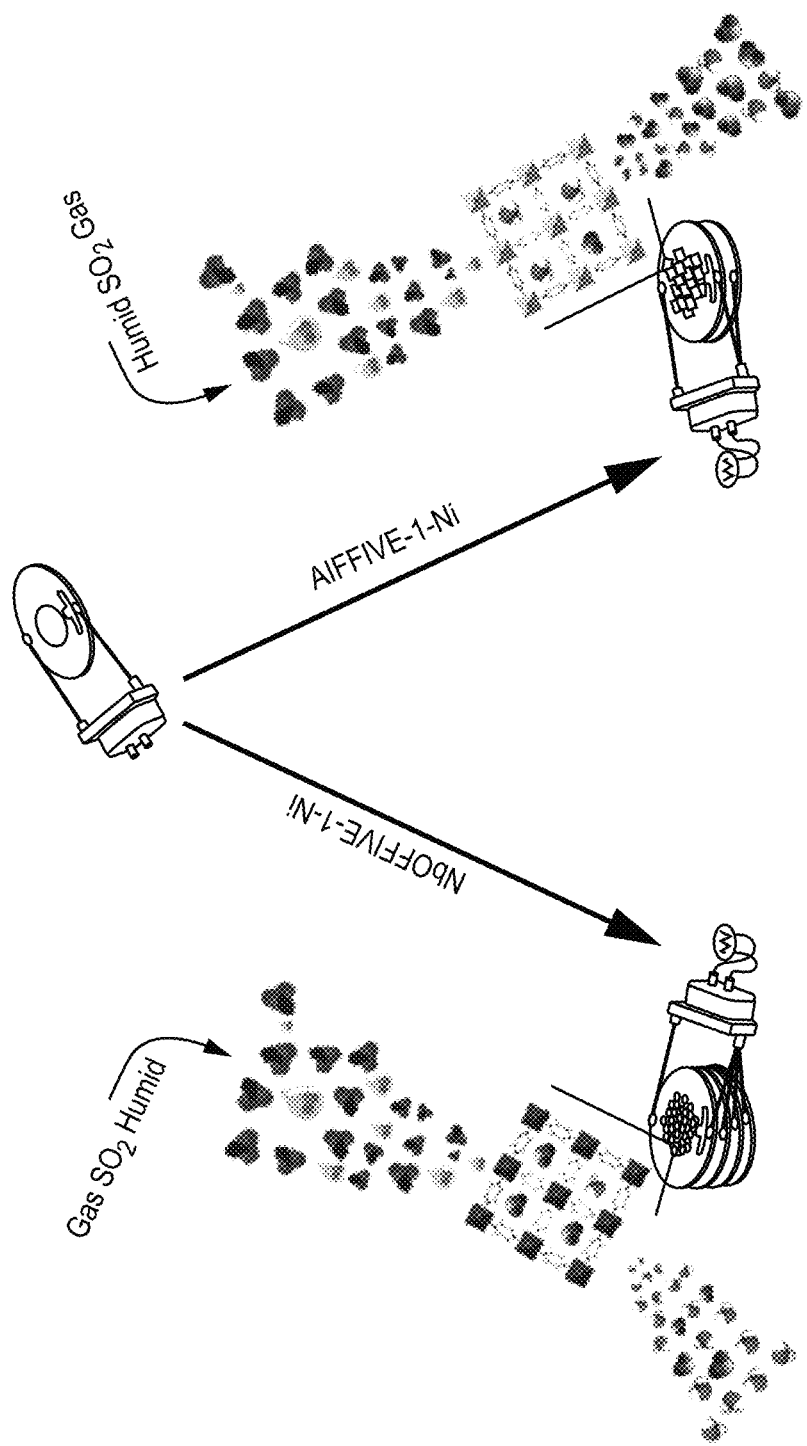
FIG. 26 is a schematic diagram illustrating the selective removal and sensing of $SO_2$ from air using fluorinated MOF Platform NbOFFIVE-1-Ni and AlFFIVE-1-Ni, according to one or more embodiments of the present disclosure.

In summary, the superior performance of two fluorinated MOFs, namely NbOFFIVE-1-Ni and AlFFIVE-1-Ni, for the capture of $SO_2$ from flue gas was successfully demonstrated. Combined single/mixed gas breakthrough experiments and molecular simulation confirmed that simultaneous capture of $SO_2$ and $CO_2$ occurred using NbOFFIVE-1-Ni, while AlFFIVE-1-Ni displayed a higher affinity for $SO_2$ with $SO_2/CO_2$ selectivity ≈66. Based on this performance, QCM-based sensors were successfully fabricated for sensing $SO_2$ from air using this fluorinated MOF platform (FIG. 26). Both MOF materials confirmed their potential, revealing good $SO_2$ detection capabilities above 25 ppm, the range of $SO_2$ concentrations in the air-inducing nose and eye irritation. This remarkable performance of sensing made these materials highly desirable for the fabrication of new advanced devices to improve health and environmental conditions.

Example 2

Concurrent Sensing of $CO_2$ and $H_2O$ from Air Using Ultramicroporous Fluorinated Meta-Organic Frameworks Conventional materials for gas/vapor sensing are limited to a single probe detection ability for specific analytes. However, materials capable of concurrent detection of two different probes in their respective harmful levels and using two types of sensing modes have yet to be explored. In particular, the concurrent detection of uncomfortable humidity levels and $CO_2$ concentration (400-5000 ppm) in confined spaces is of extreme importance in a great variety of fields, such as submarine technology, aerospace, mining, and rescue operations. The following Example reports the deliberate construction and performance assessment of extremely sensitive sensors using an interdigitated electrode (IDE)-based capacitor and a quartz crystal microbalance (QCM) as transducing substrates. The unveiled sensors were able to simultaneously detect $CO_2$ within the 400-5000 ppm range and relative humidity levels below 40 and above 60%, using two fluorinated metal-organic frameworks-namely, NbOFFIVE-1-Ni and AlFFIVE-1-Ni-fabricated as thin films. Their subtle difference in a structure-adsorption relationship for $H_2O$ and $CO_2$ was analyzed to unveil the corresponding structure-sensing property relationships using both QCM- and IDE-based sensing modes.

Metal-organic frameworks (MOFs) are a unique class of porous materials that have shown great potential for gas separation/storage, catalysis, and sensing. Recently, the use of a fluorinated MOF, namely, AlFFIVE-1-Ni, as adsorbent has offered the ability to simultaneously remove $H_2O$ and $CO_2$ from various gas streams. This property is distinctive and remarkable as the capture of both gases usually follows a competitive adsorptive mechanism. In fact, the presence of two distinct actives sites, those on open metal sites for the adsorption of $H_2O$ and those within cavities for the adsorption of $CO_2$, explains this unique simultaneous adsorption process of the AlFFIVE-1-Ni adsorbent.

In particular, this Example presents the development of the first sensing device with the ability to simultaneously detect and measure $CO_2$ and $H_2O$. In this study, harmful levels of $CO_2$ (between 400 and 5000 ppm) and uncomfortable levels of humidity (below 40% RH and higher than 60% RH) commonly present in indoor environments were established as targets for ranges of detection. Gas sensitivity performances were analyzed using two different transduction techniques: one measuring changes in mass (using QCM) and the other measuring changes in dielectric properties (using an interdigitated electrode (IDE) capacitor). The performance of AlFFIVE-1-Ni was compared with those obtained using another fluorinated MOF, NbOFFIVE-1-Ni, which displayed a competitive adsorption process of $CO_2$ and $H_2O$.

Materials and Methods

Materials

All solvents and reagents were used without further purification: $Ni(NO_3)_2 \cdot 6H_2O$ (Acros), $Al(NO_3)_3 \cdot 9H_2O$ (Aldrich), pyrazine (Aldrich), $Nb_2O_5$ (Aldrich), $Ni(NO_3)_2 \cdot 6H_2O$ (Acros), and HF (Aldrich).

AlFFIVE-1-Ni

Pyrazine (384.40 mg, 4.80 mmol), $Ni(NO_3)_2 \cdot 6H_2O$ (174.50 mg, 0.60 mmol), $Al(NO_3)_3 \cdot 9H_2O$ (225.0 mg, 0.6 mmol), and HF (aqueous, 48%, 0.26 ml, 7.15 mmol) were mixed in a 20 Ml Teflon-lined autoclave. After dilution of the mixture with 3 mL of deionized water, the autoclave was sealed and heated to 85° C. for 24 h. After cooling the reaction mixture to room temperature, the obtained blue-violet square-shaped crystals, suitable for single-crystal X-ray structure determination, were collected by filtration, washed with ethanol, and dried in air. Elemental analysis: N %, 13.76 (theor: 14.19), C %, 21.73 (theor: 24.33), H %, 3.16 (theor: 3.57). NiAlF$_5$(H$_2$O)(pyr)$_2$·2H$_2$O (called AlFFIVE-1-Ni) was activated at 105° C. for one night under high vacuum (3 mTorr) before each adsorption measurements.

NbOFFIVE-1-Ni

Pyrazine (384.40 mg, 4.80 mmol), Ni(NO$_3$)$_2$·6H$_2$O (174.50 mg, 0.60 mmol), Nb$_2$O$_5$ (79.70 mg, 0.30 mmol), and HF (aqueous, 48%, 0.26 mL, 7.15 mmol) were mixed in a 20 mL Teflon-lined autoclave. The mixture was diluted with 3 mL of deionized water, and the autoclave was then sealed and heated to 130° C. for 24 h. After cooling the reaction mixture to room temperature, the obtained violet square-shaped crystals, suitable for single-crystal X-ray structure determination, were collected by filtration, washed with ethanol, and dried in air. Elemental analysis C$_8$H$_{12}$O$_2$N$_4$F$_5$NiNb: N %, 11.88 (theor: 12.21), C %, 20.58 (theor: 20.54), H %, 2.54 (theor: 2.64), 0%, 11.42 (theor: 10.46). NiNbOF$_5$(pyr)$_2$·(H$_2$O)$_2$ (called NbOFFIVE-1-Ni) was activated at 105° C. for 12 h under high vacuum (3 mTorr) before each adsorption experiment.

QCM and IDE Electrodes.

IDE-based capacitors were fabricated on a highly resistive silicon wafer using complementary metal oxide semiconductor processes. A 2 μm silicon dioxide layer was grown using wet thermal oxidation for electrical isolation. A layer of 10/300 nm Ti/Au was subsequently sputtered-deposited via physical vapor deposition in a ESC metal sputter system. Photolithography was used in the next step of the process, to define the IDEs (4 μm fingers with 5 μm spaces). The metal layer was then etched using an ion sputtering system PlasmaLab System from Oxford Instruments, with the patterned photoresist acting as the mask layer. AT-cut QCM (10 MHz) with 6 mm diameter electrodes from openQCM was used as substrate for the mass-based sensing technique.

Fabrication of NbOFFIVE-1-Ni- and AlFFIVE-1-Ni-Coated IDE/QCM.

Electrodes were rinsed with acetone/ethanol and dried in air. MOF paste was then deposited on one of the electrode of QCMs/IDEs by spin coating method (2 μm thick). No prior modification of the sensor surface was required for this method of deposition. The method was simple in yielding good quality and uniform films. The coated electrodes were then dried at 60° C. for 2 h under vacuum to obtain thin films of sensing materials on the electrodes. The sensors were then characterized in a custom-built sealed chamber. Before any measurements, the freshly coated MOF film on the sensors was activated in situ for 4 h to have a guest-free framework. The resulting coatings were ultrathin and reproducible so that the absorbed CO$_2$ and/or water vapor induced an effective change in the mass/dielectric properties of the thin films.

Apparatus.

FIG. 8 shows the schematic of the setup used in this study for real-time gas sensing measurements. Mass flow controllers from Alicat Scientific, Inc. were used to control the flow rate of gases from certified bottles. Stainless steel or PFA tubing (in regions requiring flexibility) along with Vernier metering valves (from Swagelok) as a flow regulator was used as delivery line in the setup. A commercial humidity sensor (Honeywell HIH-4000-003, error less than 0.5% RH) was used to monitor the humidity levels inside the test chamber. The QCM-/IDE-based sensors were exposed to the analyte stream until a stable response was attained. A two-port impedance analyzer (Keysight E5071C ENA) circuit was used for monitoring the change in resonance frequency. A LabVIEW interface was used for synchronization and data acquisition by controlling the LCR meter and the multimeter. This minimized the possibility of data loss.

Results and Discussion

Preparation and Characterization of Sensing Materials

Recently, reticular chemistry allowed the fabrication of a series of fluorinated MOF materials with the ability to capture CO$_2$ from air or to dehydrate gas streams. The structure of these materials can be described as having a pcu underlying topology, where a square-grid Ni(pyrazine)$_2$ is pillared by inorganic building blocks, either [NbOF$_5$]$^{2-}$ or [AlF$_5$(H$_2$O)]$^{2-}$, to generate a channel-based MOF with a periodic array of fluorine moieties (FIGS. 9A-9C). The structural differences between these two fluorinated MOFs resulted from the presence of an open metal site in the case of AlFFIVE-1-Ni. Markedly, gas adsorption experiments on AlFFIVE-1-Ni revealed the simultaneous adsorption of CO$_2$ and H$_2$O molecules. In situ single-crystal X-ray diffraction and DFT calculations showed that the open metal sites were the preferred adsorption sites for H$_2$O molecules, whereas CO$_2$ preferably adsorbed within the cavities. Desorption experiments at set temperatures conducted after adsorption of a mixture of CO$_2$ and H$_2$O confirmed the concomitant nature of the adsorption mechanism. Similar experiments conducted with NbOFFIVE-1-Ni, an analogue with no open metal site, confirmed the competitive nature of the adsorption mechanism, with preferential adsorption of CO$_2$ to one single site located within the cavity.

On the basis of these remarkable adsorptive properties, AlFFIVE-1-Ni and NbOFFIVE-1-Ni are expected to be excellent candidates for addressing challenges faced by many chemical sensors in the concurrent detection of CO$_2$ and H$_2$O. To do so, there is a need for establishing a signal transduction process that enables the use of NbOFFIVE-1-Ni and AlFFIVE-1-Ni for chemical sensing.

In recent years, QCM and IDE technologies have been proposed as new effective tools for the rapid detection of gases, volatile organic compounds, and humidity, because of their simplicity, small size, low cost, high sensitivity, shorter time of analysis, and suitability for label-free measurements. The resonant frequency of QCM substrates depends on the amount of adsorbed material. QCM can detect the change in a mass of subnanograms. The relationship between the shift in frequency and the mass loading is described by the Sauerbrey equation. Capacitive IDEs can be used to sense the change in sensing film permittivity upon gas adsorption and are seen as attractive candidates from a power consumption perspective.

Figure 27A:
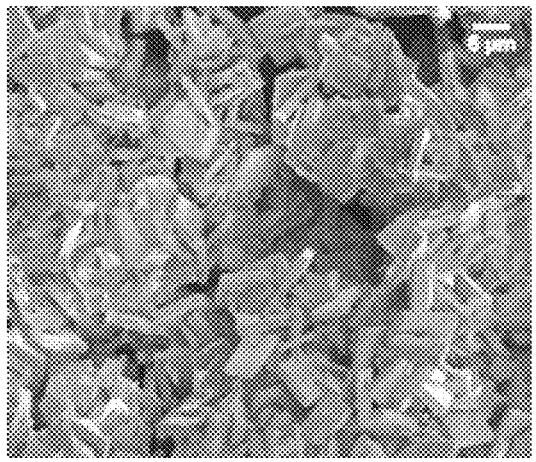
FIGS. 27A-27B are SEM images of (a) NBOFFIVE-1-Ni and (B) AlFFIVE-1-NI thin films, according to one or more embodiments of the present disclosure.
Figure 27B:
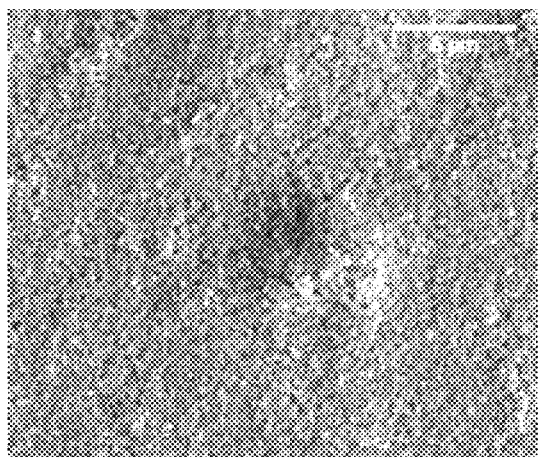
Figure 28B:
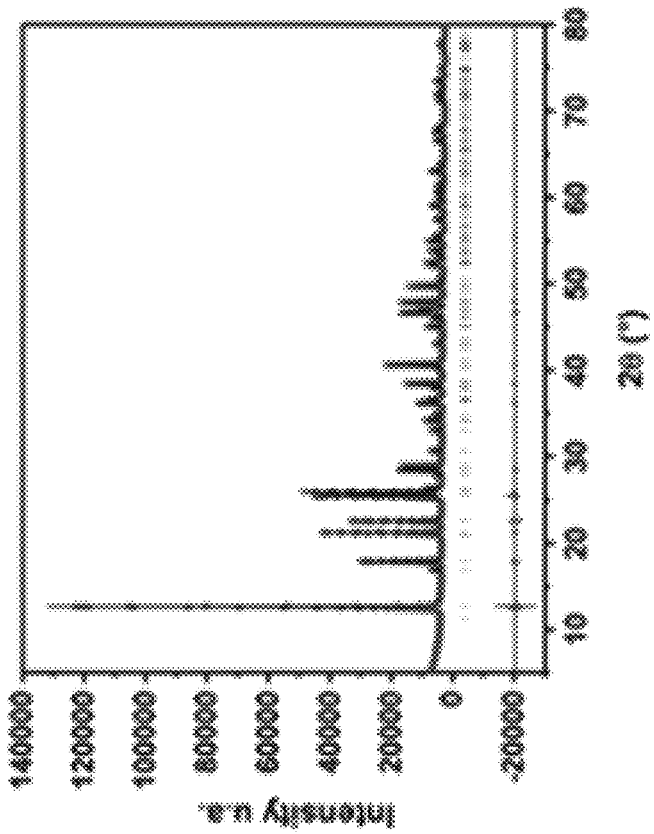
FIGS. 28A-28B are graphical views of final Le Bail profile refinement with observed (black line), calculated (red point), and difference (blue line) profiles of X-ray of diffraction data; vertical green bars are related to the calculated Bragg reflection positions, where (a) NbOFFIVE-1-Ni ($R_p$=0.074, $R_{wp}$=0.079, $R_{exp}$=0.031, $\chi^2$=6.73). (b) AlFFIVE-1-Ni ($R_p$=0.086, $R_{wp}$=0.108, $R_{exp}$=0.022, $\chi^2$=23.1), according to one or more embodiments of the present disclosure.
Figure 28A:
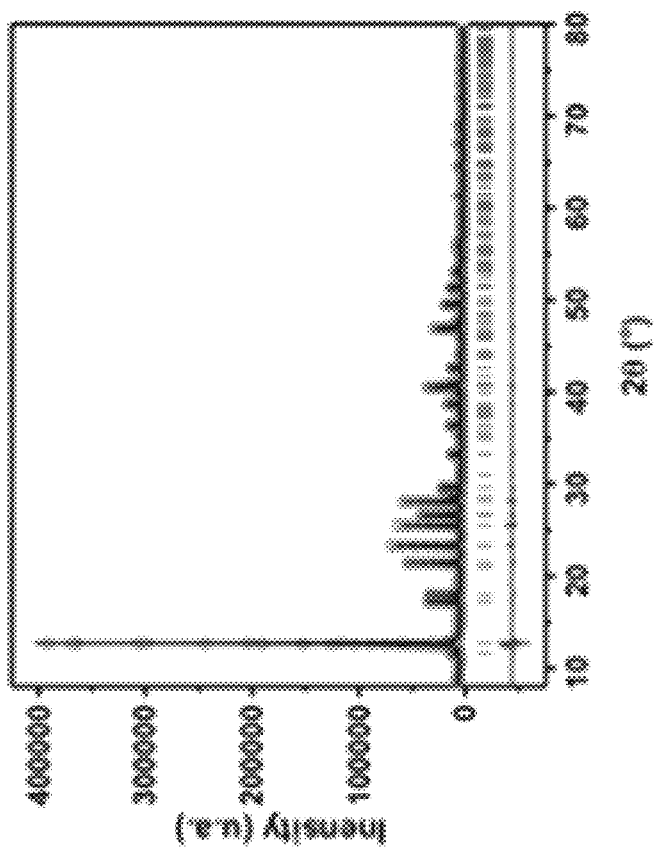

The key element of any chemical sensor is the sensitive layer that captures the analyte gases. MOF films are generally grown on surfaces that have been functionalized with self-assembled monolayers or by seeding with small MOF crystal. The nanostructures of these thin films have not yet been well characterized and sometimes lead to improper growth of the desired thin film. In this context, Applicants have developed, for the first time, a new synthesis method to obtain a soft homogeneous MOF solution with a paste-like consistency, making it well suited for the preparation of a wide range of homogeneous thin film. Indeed, the method can easily be adapted to the deposition or spin coating of thin films from a chemical solution. A representation of this is presented in (FIGS. 27A-27B), which shows a good uniformity in the deposition of the crystals, along with an improved adhesion to the substrates. AlFFIVE-1-Ni and NbOFFIVE-1-Ni films contain close-packed crystal domains, exhibiting a good coalescence of microcrystals with small intergranular voids, leading to compact and uniform MOF films of excellent crystallinity. NbOFFIVE-1-Ni films comprised small cubic crystallites of approximately 150 nm, whereas larger crystallites of about 7 μm were found for AlFFIVE-1-Ni. The purity and crystallinity of the deposited MOF films were confirmed by powder X-ray diffraction experiments (FIGS. 28A-28B).

Gas Sensing Properties

Concurrent Sensing of $CO_2$ and $H_2O$

Figure 29:
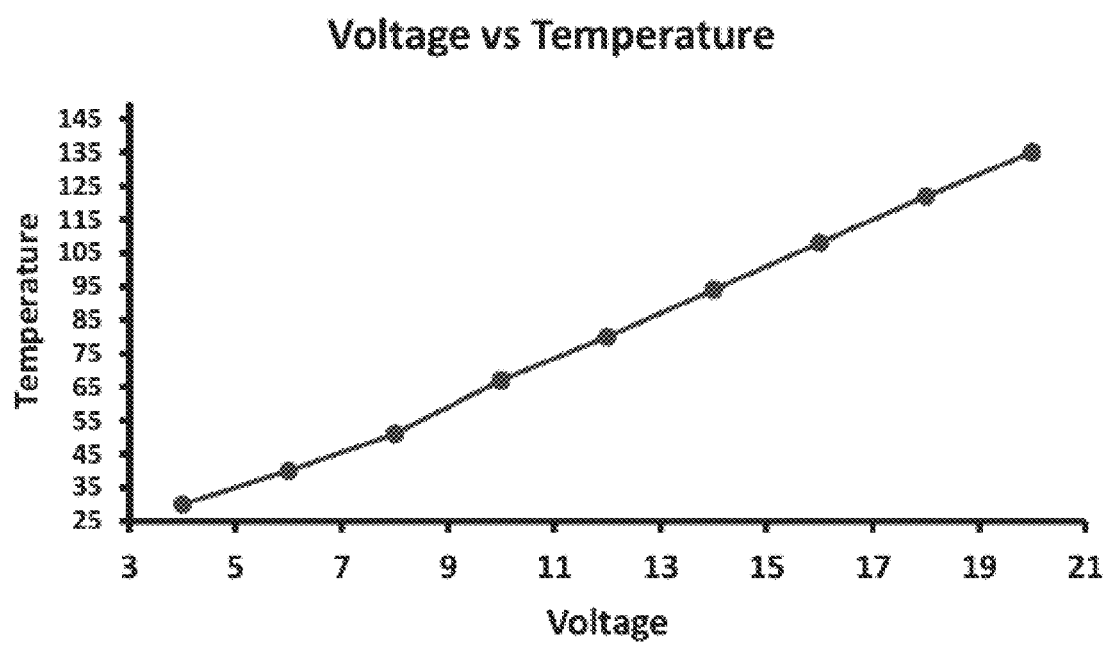
FIG. 29 is a graphical view of a voltage to temperature calibration curve, according to one or more embodiments of the present disclosure.

The use of MOF thin films for sensing application required a critical activation step, permitting the attainment of a guest-free thin film before any sensing signal measurement was to be performed. For this reason, the MOF adsorbent was fully reactivated at 105° C., before each new cycle of analyte exposure, using in situ heating provided by a HT24S metal ceramic heater from Thorlabs. The output temperature of the heater was calibrated and monitored using a LM35DZ/NOPB commercial temperature sensor from Texas Instruments (FIG. 29). This calibration was of prime importance to preserve the integrity of the MOF adsorbent and to ensure that guest-free activated NbOFFIVE-1-Ni and AlFFIVE-1-Ni were obtained before sensing experiments.

Figure 30A:
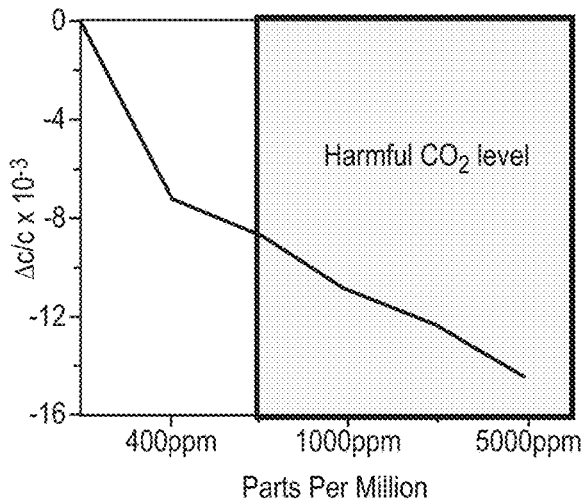
FIGS. 30A-30D are graphical views showing the capacitive sensor response for (a) NbOFFIVE-1-Ni and (b) AlFFIVE-1-Ni and the comparison of frequency shifts as a function of the $CO_2$ concentration for (c) NbOFFIVE-1-Ni and (d) AlFFIVE-1-Ni, according to one or more embodiments of the present disclosure.
Figure 30B:
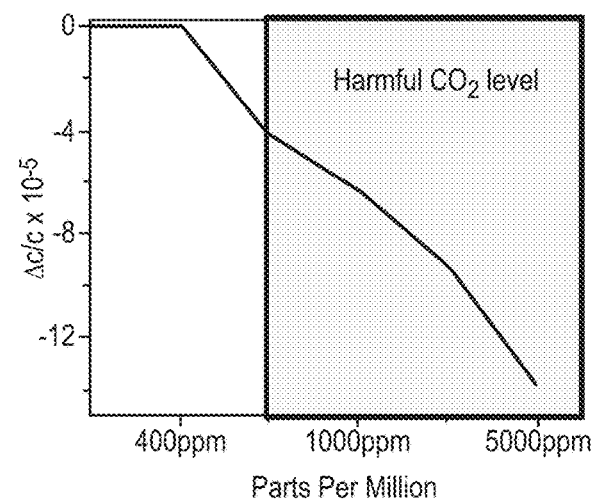

The sensing characteristics and performance of NbOFFIVE-1-Ni and AlFFIVE-1-Ni were investigated at variable $CO_2$ concentration in dry and humid conditions to verify the potential application of the newly fabricated sensors. Interestingly, NbOFFIVE-1-Ni and AlFFIVE-1-Ni coated on IDE and QCM as sensors exhibited a nonlinear change in the signal over several orders of magnitude of $CO_2$ concentration (from 400 to 5000 ppm). The capacitive properties of the IDE exhibited a dielectric constant dependency of the material, because of the change in $CO_2$ concentration. The capacitance was calculated using the standard capacitance equation. The exposure of all sensors to different dry $CO_2$ concentrations led to a sharp decrease in the capacitance (FIGS. 30A-30B). Additionally, the interaction of $CO_2$ with NbOFFIVE-1-Ni and AlFFIVE-1-Ni changed the local dielectric properties of the thin films, resulting in a decrease in capacitance. Remarkably, the interdigitated sensor devices coated with NbOFFIVE-1-Ni showed a significantly higher change in capacitance (about 100 times, for 400-5000 ppm of $CO_2$) when compared to AlFFIVE-1-Ni. These observations were in agreement with the remarkably favorable selectivity of $CO_2$ obtained from calorimetric and co-adsorption tests.

Figure 30C:
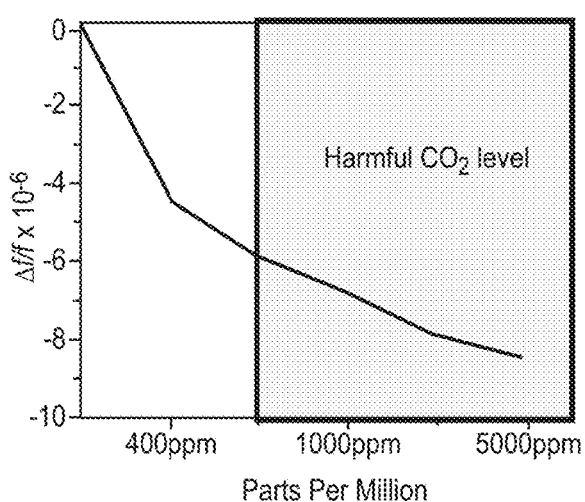
Figure 30D:
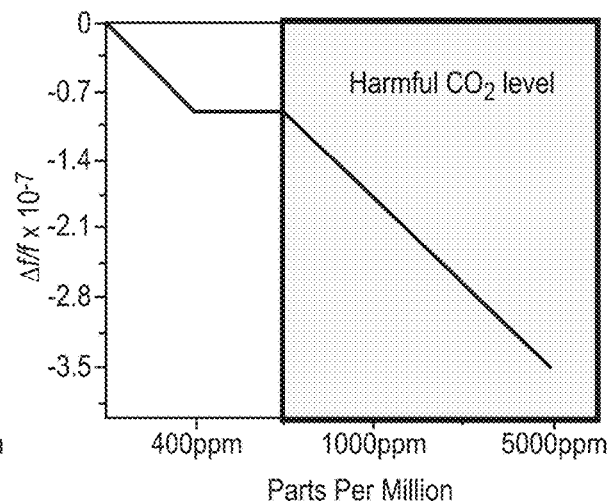
Figure 31A:
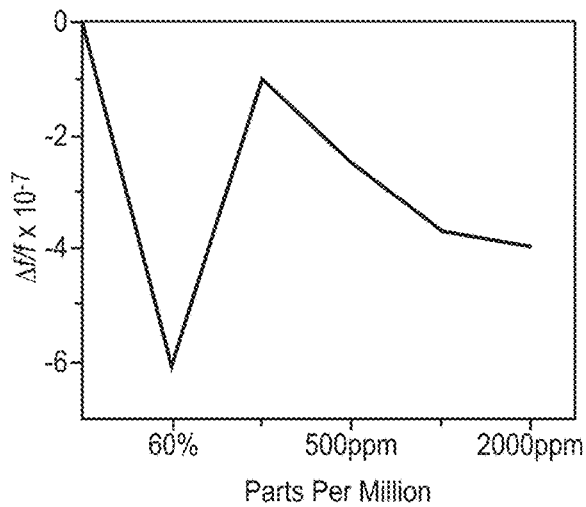
FIGS. 31A-31D are graphical views showing the stability detection of $CO_2$ upon exposure to 60% RH of the NbOFFIVE-1-Ni and AlFFIVE-1-Ni films based on (a-b) QCM and (c-d) IDE sensors, according to one or more embodiments of the present disclosure.
Figure 31B:
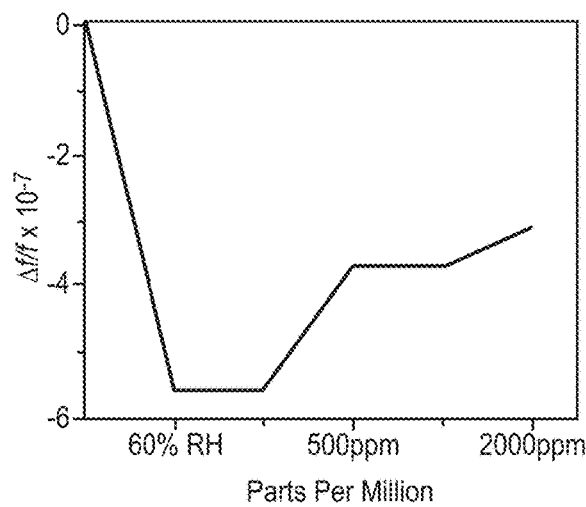
Figure 31C:
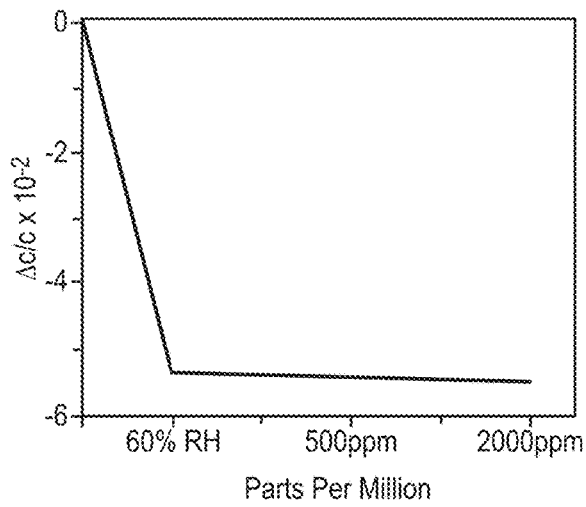
Figure 31D:
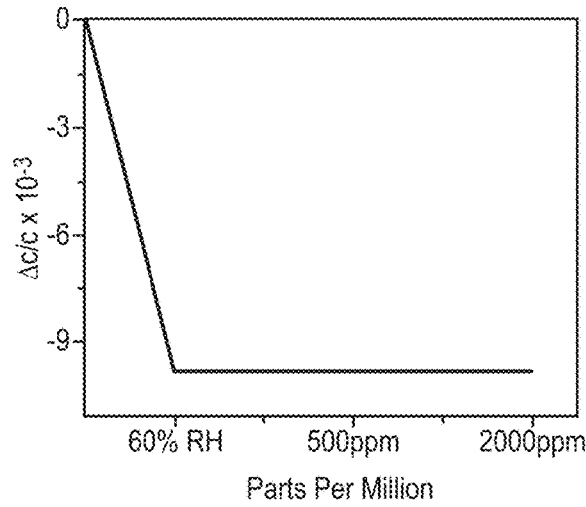
Figure 32A:
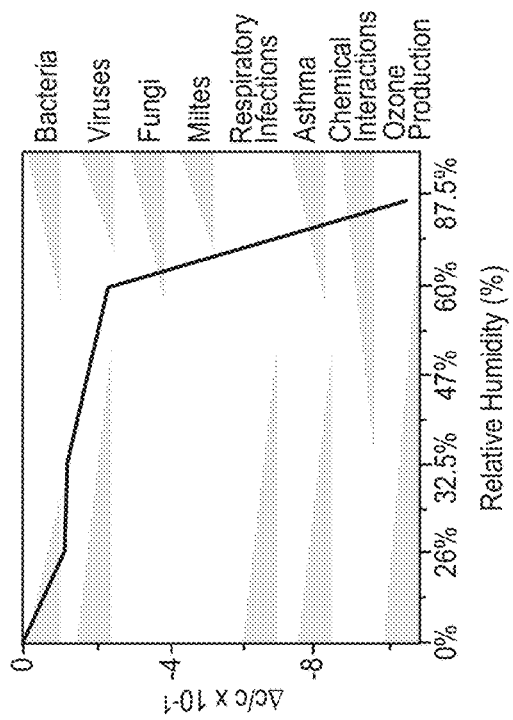
FIGS. 32A-32D are graphical views showing the variation in capacitance with relative humidity (RH) change in (a) NbOFFIVE-1-Ni and (b) AlFFIVE-1-Ni and frequency shift as a function of RH for QCM coated with (c) NbOFFIVE-1-Ni and (d) AlFFIVE-1-Ni, according to one or more embodiments of the present disclosure.
Figure 32B:
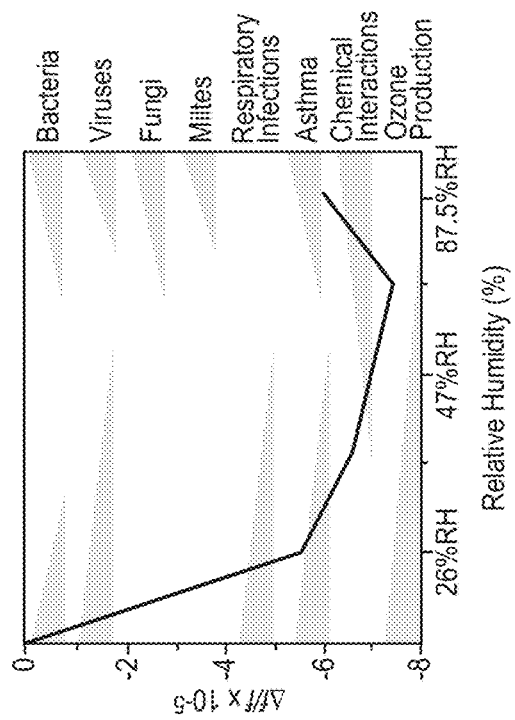
Figure 32C:
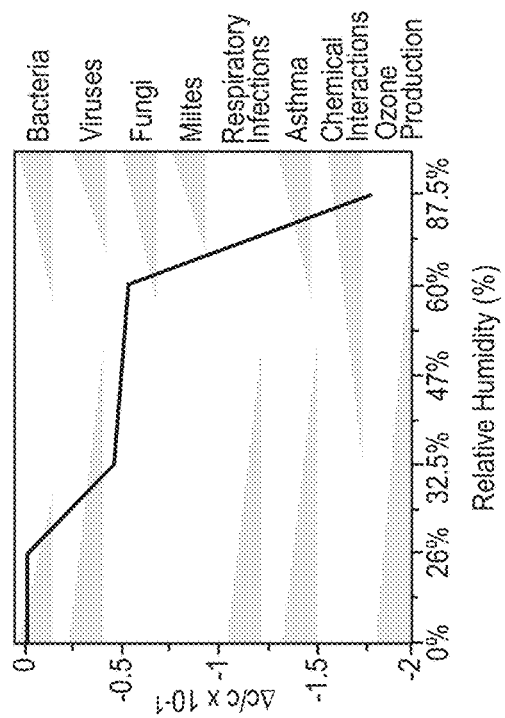
Figure 32D:
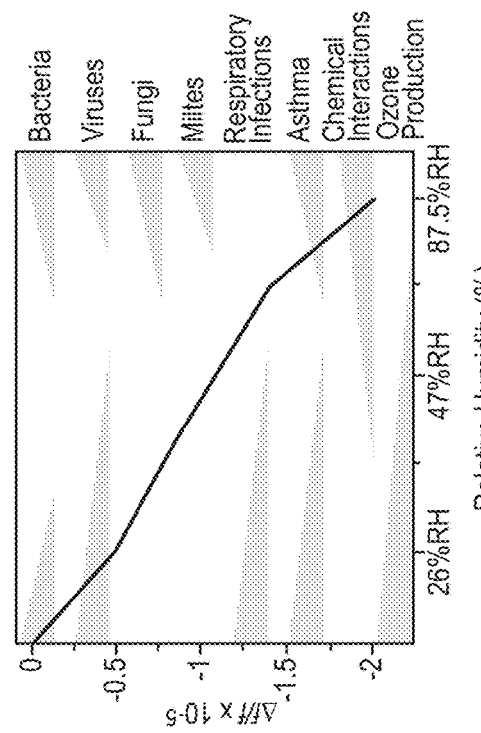
Figure 33A:
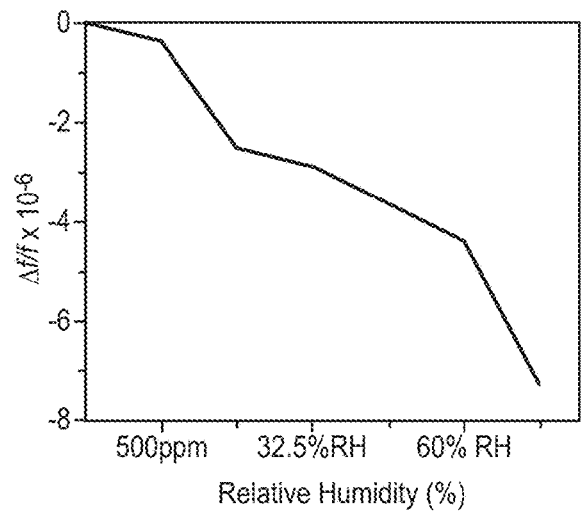
FIGS. 33A-33D are graphical views showing the stability detection of $H_2O$ upon exposure to 500 ppm $CO_2$ of the NbOFFIVE-1-Ni and AlFFIVE-1-Ni films based on (a-b) QCM and (c-d) IDE sensors, according to one or more embodiments of the present disclosure.
Figure 33B:
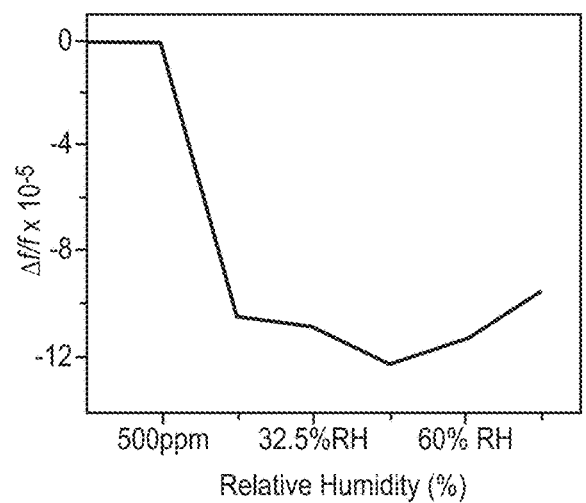
Figure 33C:
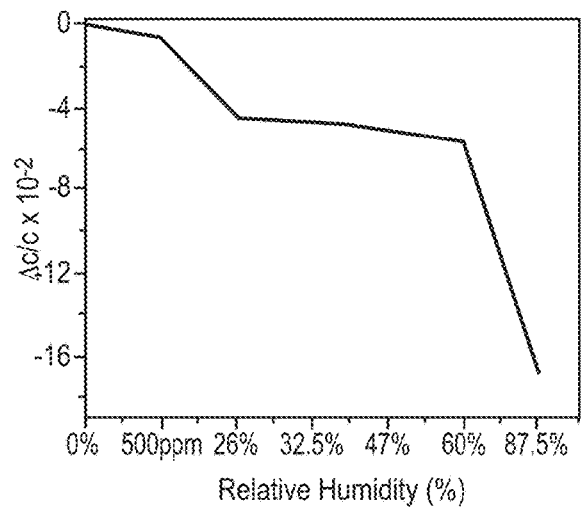
Figure 33D:
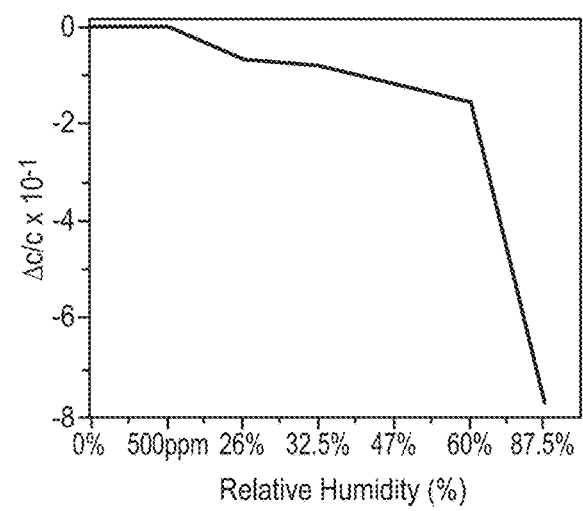

FIGS. 30C-30D depict the concentration-dependent responses of NbOFFIVE-1-Ni or AlFFIVE-1-Ni coated on QCMs as sensors to different concentrations of $CO_2$ at room temperature and under dry conditions. It was observed that when the gas entered in contact with the QCM-based sensors, $CO_2$ molecules were adsorbed on the sensitive film and the mass increased in a proportional manner, producing a negative shift in resonance frequency. That is, the decrease in resonant frequency (FIGS. 30C-30D) as the $CO_2$ concentration increased was seen very clearly, showing a good response of the QCM to $CO_2$.

In the case of QCM devices, the maximum shifts in frequency were −84.85 Hz for NbOFFIVE-1-Ni and −3.5 Hz for AlFFIVE-1-Ni at $CO_2$ concentrations ranging from 400 to 5000 ppm. These results were in good agreement with NbOFFIVE-1-Ni exhibiting a higher interaction with $CO_2$ at a low loading (53 kJ/mol) versus a weaker interaction (45 kJ/mol) for AlFFIVE-1-Ni. In the case of IDE sensing mode under dry $CO_2$ conditions, a high adsorptive selectivity was observed at low $CO_2$ loadings and concentrations for NbOFFIVE-1-Ni versus AlFFIVE-1-Ni.

Interestingly, the MOF-coated mass-sensitive QCM devices exhibited a lower sensitivity toward $CO_2$ under dry conditions than the IDE capacitors. Part of the reason for this difference was that the IDE capacitors can detect larger effects of $CO_2$ on dielectric properties of the thin films, whereas the mass-sensitive QCM devices were only able to detect small mass changes.

Effect of Synthetic Air on Concurrent Sensing of $CO_2$ and $H_2O$.

In general, the moisture from the environment had a considerable impact on the sensitivity of the gas sensor and must be taken into consideration for practical deployment of any sensor. Therefore, the concentration-dependent response of the IDE and QCM devices coated with NbOFFIVE-1-Ni or AlFFIVE-1-Ni to $CO_2$ under humid conditions was investigated. The relationship between the resonant frequencies of the QCM sensors and the RH (60%) is shown in FIGS. 31A-31D.

The sensitivity of NbOFFIVE-1-Ni coated on QCM as a sensor was reduced in the presence of moisture and was easily distinguishable from the response of $CO_2$ in the air. However, the sensitivity was considerably reduced with AlFFIVE-1-Ni-coated QCM, and its frequency was reduced even more, especially at low $CO_2$ concentrations. In the case of IDE-type sensing, NbOFFIVE-1-Ni- and AlFFIVE-1-Ni-coated IDE sensors were greatly affected by the presence of moisture. In fact, an often heard objection to capacitive sensor technology is that it is sensitive to humidity, yet the capacitive sensor is based on dielectric changes of the thin film upon water vapor uptake. Practically, humidity and condensable vapors are shown to have a significant effect on the IDE-based sensors because water has a dielectric constant $\varepsilon r$ of 78.3, that is, ∼48 times larger than $CO_2$ ($\varepsilon r$=1.60). The presence of moisture often interferes with the IDE sensory signal of $CO_2$ and thereby can hamper its qualitative identification and quantification. Accordingly, the results presented here show that QCM-based sensors are a good alternative to compensate the loss of performance in IDE-based sensors, because of the presence of humidity.

A detailed analysis of the sensitivity to $H_2O$ as a function of RH (26 to 60% RH) was performed to further delineate the water vapor adsorptive based sensing performance.

After an initial activation cycle at 105° C., the sensors were cooled to room temperature and subsequently exposed to different levels of RH, using $N_2$ as a gas carrier. The RH level was varied by changing the carrier flow (0 to 200 mL/min) bubbling through the water. It should be noted that an ideal sensor swiftly senses water vapor, in the optimal range of 26-65% RH. This is the desired range of humidity levels for confined spaces, conforming to the standards set by the occupational health safety. The humidity sensing behavior of the AlFFIVE-1-Ni-/NbOFFIVE-1-Ni-coated IDE- and QCM-based sensors, as shown in FIGS. 32A-32D, revealed a response in a nonlinear fashion with good sensitivity in the recommended range of humidity levels (26-65% RH). Notably, AlFFIVE-1-Ni and NbOFFIVE-1-Ni had an almost simultaneous response to change in humidity levels; however, as expected, the presence of an open metal site in highly confined pores, in the case of AlFFIVE-1-Ni thin films, offered a greater sensitivity to humidity. In fact, the exposed $Al^{3+}$ of the AlFFIVE-1-Ni framework served as the initial preferable adsorption site for water molecules, when exposed to different levels of RH levels.

Humidity levels above 60% have a considerable impact on the sensitivity, which was related to the nature of the MOF adsorbent. AlFFIVE-1-Ni exhibited a sensitivity five times higher than NbOFFIVE-1-Ni, in the 26-60% RH range. On the other hand, a comparison of the effects of the transduction mechanisms on the sensing performance under humid conditions clearly showed that QCM-based sensors were more reluctant to changes than IDE-based devices.

It is to be noted that the shift in frequency and capacitance decreased more steeply, when RH exceeded 60%, a phenomenon that can be explained by the aggregation of water molecules on thin films.

To mimic the real conditions (atmospheric conditions), experiments were also performed in the presence of 500 ppm $CO_2$, using both transduction techniques (FIGS. 33A-33D). After an initial exposure to 500 ppm $CO_2$, both samples exhibited a decrease in their sensing signals, as a function of the subsequent exposure to humidity. In the case of AlFFIVE-1-Ni, this decrease was almost two times higher than that observed for NbOFFIVE-1-Ni.

Interestingly, changes in $CO_2$ levels had a lower impact (four times lower) for NbOFFIVE-1-Ni than that for AlFFIVE-1-Ni. This suggested that a partial desorption of noncoordinated water molecules occurred easily for NbOFFIVE-1-Ni, because of their relatively weak interactions occurring with the framework, compared to those of $CO_2$ with the framework. In the case of AlFFIVE-1-Ni, the water molecules coordinated to the open metal site could not be desorbed because of their stronger interaction with the open metal sites in the presence of $CO_2$, therefore causing unchanged performances for water detection. Although both QCM and IDE responded to variable $H_2O$ and $CO_2$ concentrations, the sensitivities were not identical. Accordingly, the detection of $CO_2$ in the presence of variable humidity levels under real (atmospheric) conditions were directly observed by a shift in the resonance frequency of QCM. However, the capacitive sensor did a much better job of reflecting the changes in humidity levels in the presence of 500 ppm $CO_2$.

Stability Studies.

Figure 34B:
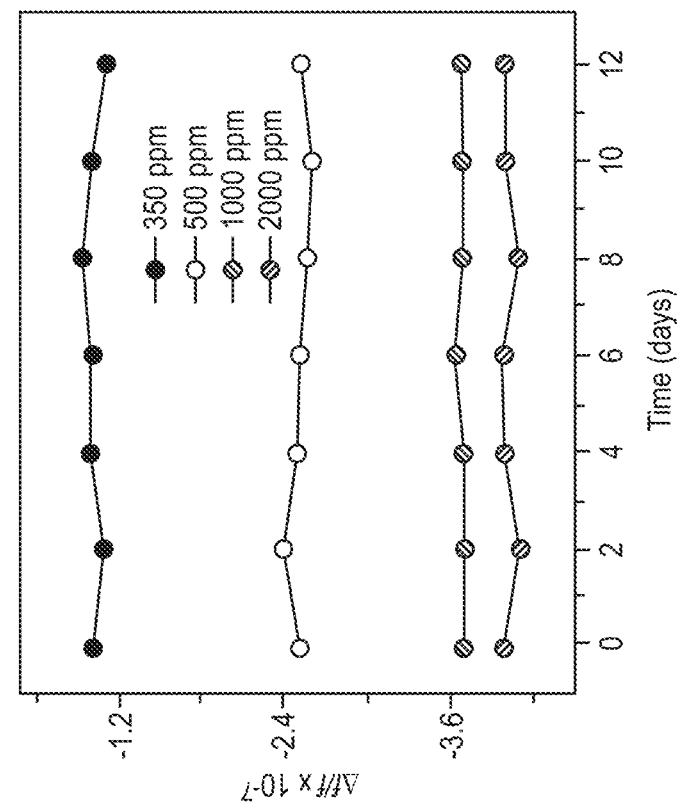
FIGS. 34A-34B are graphical views showing long-term stability properties of (a) $H_2O$ upon prior exposure to 500 ppm $CO_2$ of the AlFFIVE-1-Ni/IDE sensor and (b) $CO_2$ upon prior exposure to 60% RH of the NbOFFIVE-1-Ni/QCM sensor, according to one or more embodiments of the present disclosure.
Figure 34A:
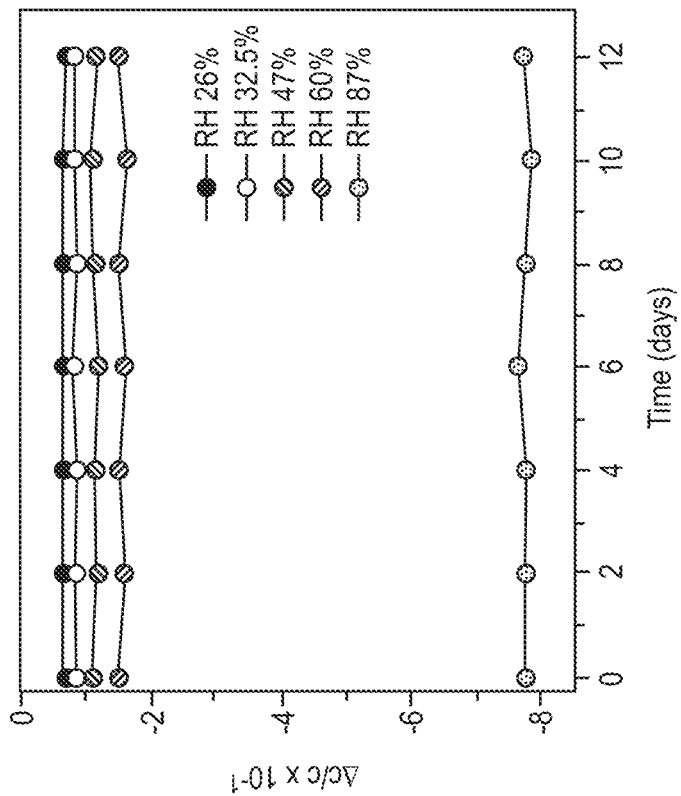

The most important parameters for a given sensing device are its stability and reproducibility. These parameters were investigated by cyclic exposure every 48 h at room temperature for over a period of 12 days (FIGS. 34A-34B). It was clearly shown that both sensor responses did not vary significantly with time, confirming their long-term stability.

These results pinpointed some of the most important elements required for the choice of materials granting comfortable/healthy indoor conditions; they also shed light on the associated transduction mechanisms required for the concurrent detection of harmful levels of $CO_2$ and humidity in a condition akin to atmospheric conditions and confined environments. The response of the sensors to humidity and $CO_2$ showed that sensitivity and resolution were dependent on both the transduction mechanism and the sensing material. However, the response, stability, selectivity, detection limit, and life cycle were found to depend only on the intrinsic properties of the sensing material.

In summary, the present Example reports, for the first time, the use of both IDE- and QCM-based sensors for the simultaneous detection of $CO_2$ and $H_2O$ using ultramicroporous fluorinated MOFs, exhibiting unprecedented structural $CO_2$—$H_2O$ adsorption properties. The sensors exhibited excellent selectivity for sensing $CO_2$ at variable humidity levels; they also detected humidity levels at variable $CO_2$ concentrations. It has been shown that isostructural fluorinated MOF-based capacitance sensitive sensors possessed good $CO_2$ sensing properties under dry conditions. When working under real conditions (atmospheric conditions), the change in the dielectric constant over the change in the $CO_2$ concentrations and at a constant humidity level of 60% RH resulted in a decrease in capacitance. The detection of $CO_2$ under real conditions was directly observed on the QCM frequency shift. However, the capacitive sensor did a better job reflecting the changes in humidity in the presence of $CO_2$. At room temperature, all the sensor's properties reported herein make the reported sensor a promising candidate for the detection of $CO_2$ and water vapor when used for indoor and confined spaces.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A method of capturing chemical species, comprising:
contacting a metal-organic framework with a fluid composition including one or more of $SO_2$, $CO_2$, and $H_2O$,
wherein the metal-organic framework is characterized by the chemical formula $NiNbOF_5(pyrazine)_2 \cdot x(Solv)$ or $NiAlF_5(H_2O)(pyrazine)_2 \cdot x(solv)$,
wherein the metal-organic framework comprises a square grid pillared by an inorganic building block, wherein the square grid is $Ni(pyrazine)_2$ and the inorganic building block is selected from $[NbOF_5]^{2-}$ or $[AlF_5(H_2O)]^{2-}$; and
sorbing one or more of $SO_2$, $CO_2$, and $H_2O$ from the fluid composition on the metal-organic framework.

2. The method of claim 1, wherein the fluid composition includes $SO_2$ at a concentration in the range of 25 ppm to 500 ppm.

3. The method of claim 1, wherein the fluid composition includes $SO_2$ and $CO_2$, and $SO_2$ is preferentially sorbed over $CO_2$ on the metal-organic framework.

4. The method of claim 1, wherein the fluid composition includes $SO_2$ and $CO_2$, and $SO_2$ and $CO_2$ are both sorbed on the metal-organic framework.

5. The method of claim 4, wherein $SO_2$ and $CO_2$ are sorbed about simultaneously on the metal-organic framework.

6. The method of claim 1, wherein the fluid composition includes $CO_2$ at a concentration in the range of 400 ppm to 5000 ppm.

7. The method of claim 1, wherein the fluid composition includes $CO_2$ and $H_2O$, and $CO_2$ is preferentially sorbed over $H_2O$ on the metal-organic framework.

8. The method of claim 1, wherein the fluid composition includes $CO_2$ and $H_2O$, and $CO_2$ and $H_2O$ are both sorbed on the metal-organic framework.

9. The method of claim 8, wherein the $CO_2$ and $H_2O$ are sorbed about simultaneously on the metal-organic framework.

10. The method of claim 1, wherein the sorbing proceeds at about room temperature.

11. A method of detecting one or more analytes, the method comprising:
contacting a sensor to an environment containing one or more of $SO_2$, $CO_2$, and $H_2O$,
wherein the metal-organic framework is characterized by the chemical formula $NiNbOF_5(pyrazine)_2 \cdot x(Solv)$ or $NiAlF_5(H_2O)(pyrazine)_2 \cdot x(solv)$;
wherein the sensor includes a layer of a metal-organic framework as a sensing layer, wherein the metal-organic framework comprises a square grid pillared by an inorganic building block, wherein the square grid is $Ni(pyrazine)_2$ and the inorganic building block is selected from $[NbOF_5]^{2-}$ or $[AlF_5(H_2O)]^{2-}$; and
detecting a presence of one or more of $SO_2$, $CO_2$, and $H_2O$ in the environment using the sensor.

12. The method of claim 11, wherein the detecting proceeds at about room temperature.

13. The method of claim 11, wherein the detecting includes detecting $SO_2$ optionally in the presence of $H_2O$.

14. The method of claim 11, wherein the detecting includes detecting between 25 ppm $SO_2$ to 500 ppm $SO_2$ in the environment.

15. The method of claim 11, wherein the detecting includes detecting $CO_2$ optionally in the presence of $H_2O$.

16. The method of claim 11, wherein the detecting includes detecting between 400 ppm of $CO_2$ and 5000 ppm of $CO_2$ in the environment.

17. The method of claim 11, wherein the detecting includes detecting $H_2O$ optionally in the presence of $CO_2$.

18. The method of claim 11, wherein the detecting includes detecting relative humidity levels in the environment below about 40% RH and/or greater than about 60% RH.

19. The method of claim 11, wherein the sensor is a capacitive sensor comprising an interdigitated electrode, wherein the sensing layer is deposited on the interdigitated electrode of the capacitive sensor, wherein the presence of one or more of $SO_2$, $CO_2$, and $H_2O$ is detected by measuring a change in capacitance in the sensing layer.

20. The method of claim 11, wherein the sensor is a QCM sensor comprising an electrode, wherein the sensing layer is deposited on the electrode of the QCM, wherein the presence of one or more of $SO_2$, $CO_2$, and $H_2O$ is detected by measuring a change in resonance frequency in the sensing layer.

* * * * *